(12) United States Patent
Yoshimoto et al.

(10) Patent No.: US 6,580,523 B1
(45) Date of Patent: Jun. 17, 2003

(54) COLOR IMAGE PRINTER

(75) Inventors: Masahiro Yoshimoto, Tokyo (JP); Koji Urasawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/158,898

(22) Filed: Sep. 23, 1998

(30) Foreign Application Priority Data

Sep. 24, 1997 (JP) ............................................. 9-278090

(51) Int. Cl.[7] .............................................. G06F 15/00
(52) U.S. Cl. ........................ 358/1.4; 358/501; 399/299
(58) Field of Search ........................ 358/1.4, 1.9, 1.12, 358/1.13, 1.14, 451, 501, 502, 512, 513, 514, 518, 526, 534, 537; 399/45, 223, 228, 298, 299; 342/115

(56) References Cited

U.S. PATENT DOCUMENTS 5,414,530 A * 5/1995 Sakai .......................... 358/451
5,612,771 A * 3/1997 Yamamoto et al. ......... 399/301
5,905,013 A * 5/1999 Seto ............................ 399/308
5,956,162 A * 9/1999 Nobuta ........................ 358/500

* cited by examiner

*Primary Examiner*—Mark Wallerson
(74) *Attorney, Agent, or Firm*—Rabin & Berdo, P.C.

(57) ABSTRACT

A color image printing apparatus has a plurality of positioning mechanisms each of which selectively positions a corresponding photoconductive drum at an operative position and a non-operative position. A controlling section selectively controls the positioning mechanisms in a first operation mode or in a second operation mode according to the color detected in the color plane by the color detecting section. The first operation mode is a mode where the controlling section causes a positioning mechanism corresponding to the color detected by the color detecting section to the operative position, and the positioning mechanism remains at the operative position throughout the job once it is brought to the operative position. The second operation mode is a mode where if only black is detected in the first page of a job then a photoconductive drum corresponding to black is brought to the operative position, and if any one of yellow, magenta, and cyan black is detected in a subsequent page, the controlling section causes all of the positioning mechanisms to be brought to their operative positions.

31 Claims, 32 Drawing Sheets

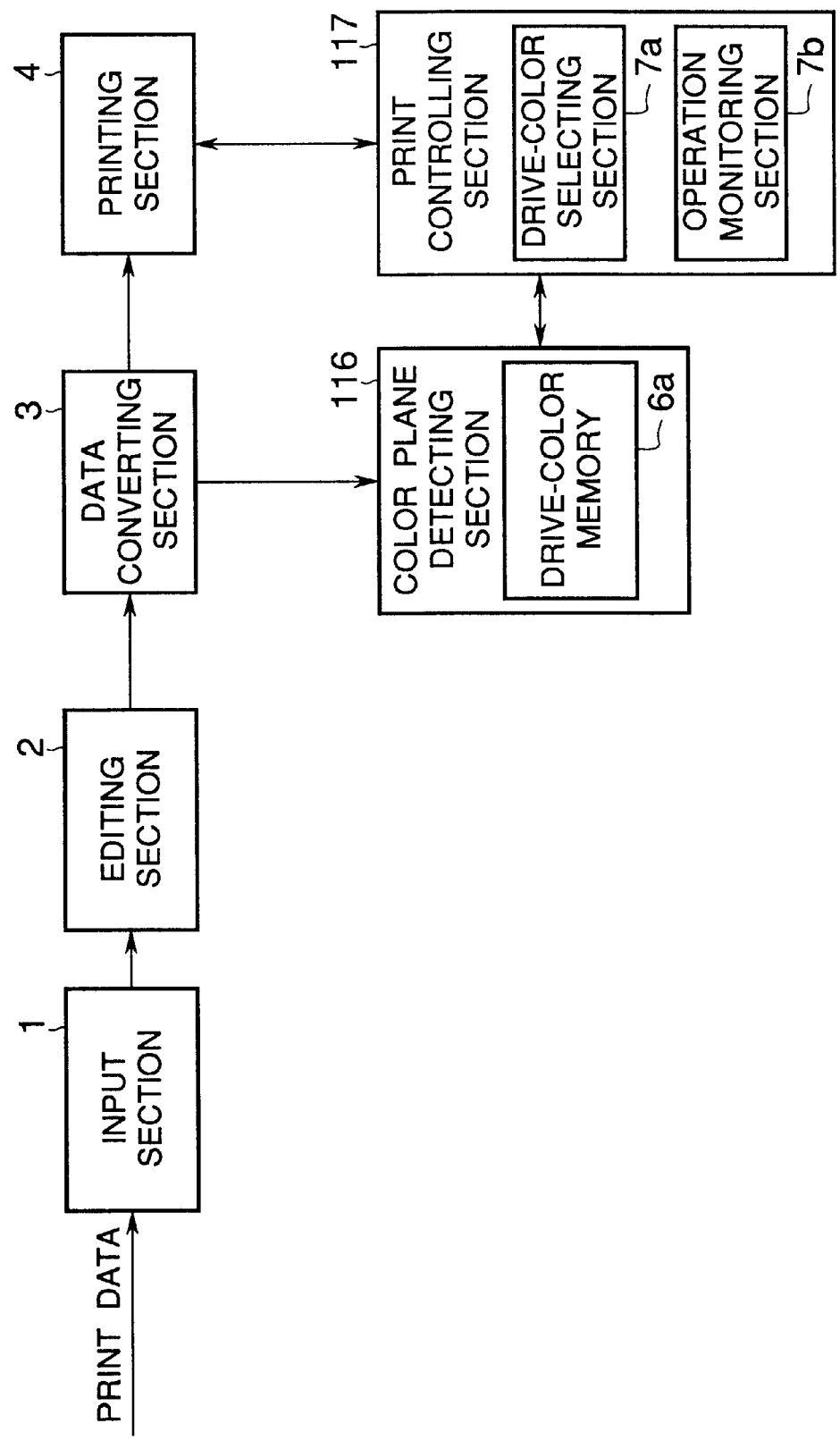

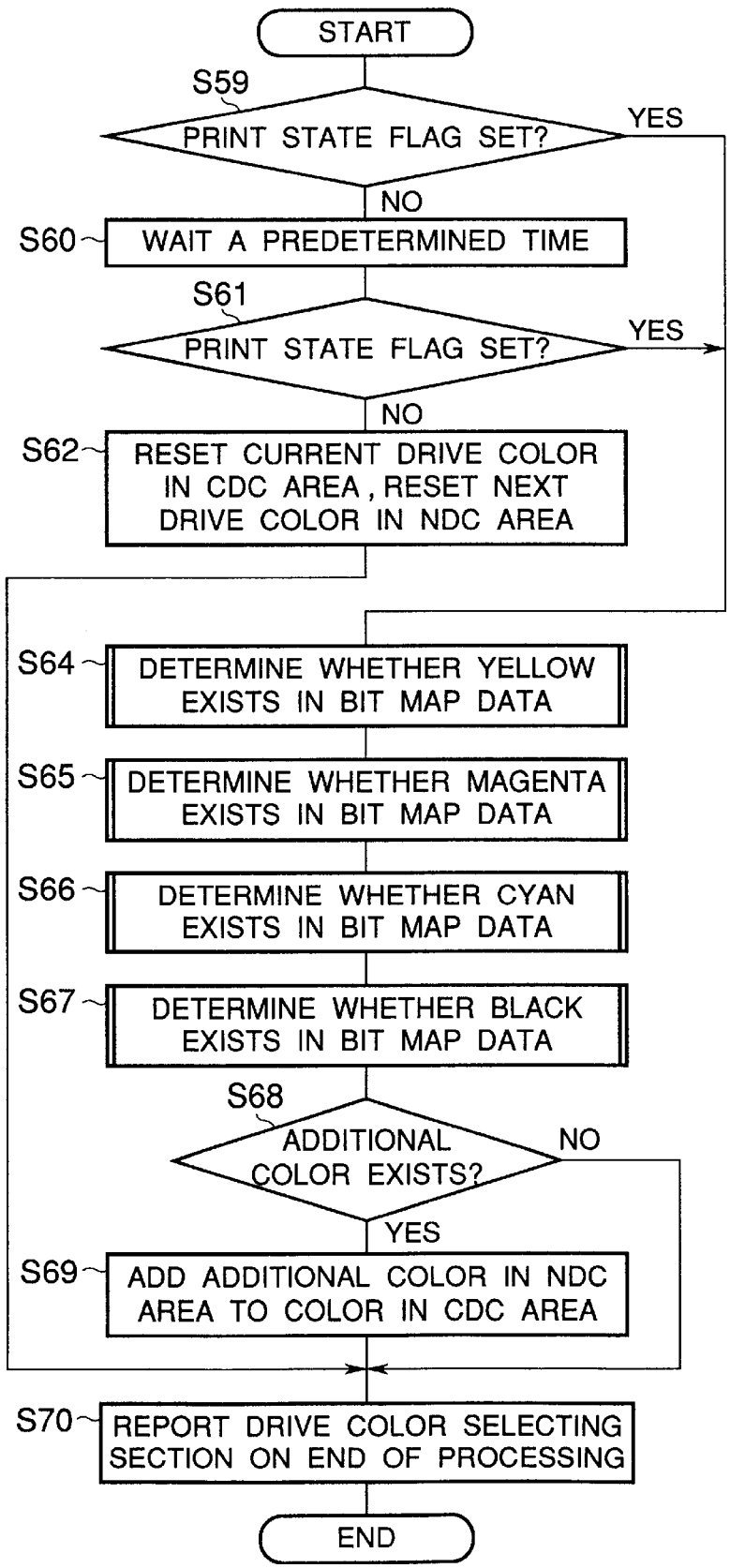

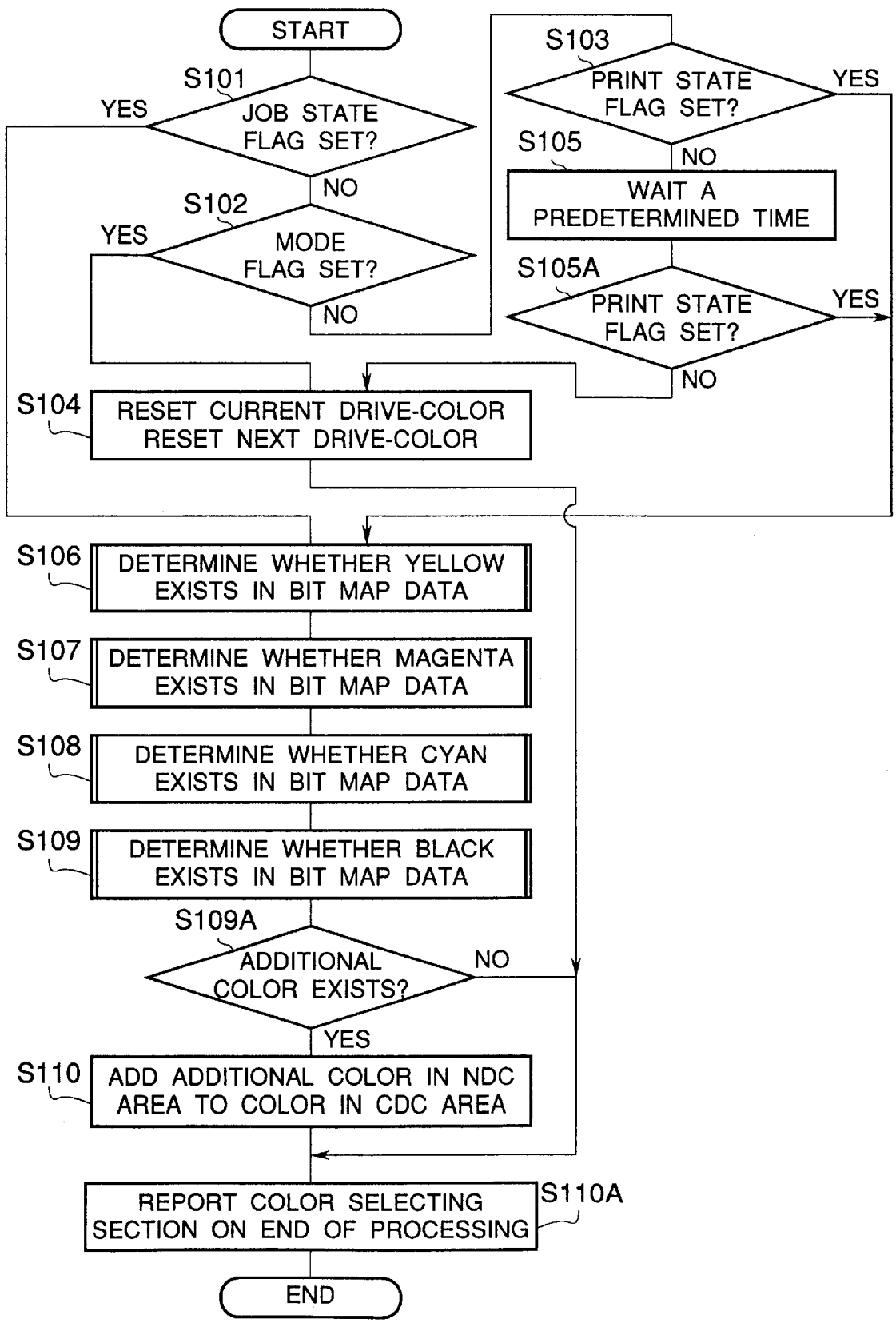

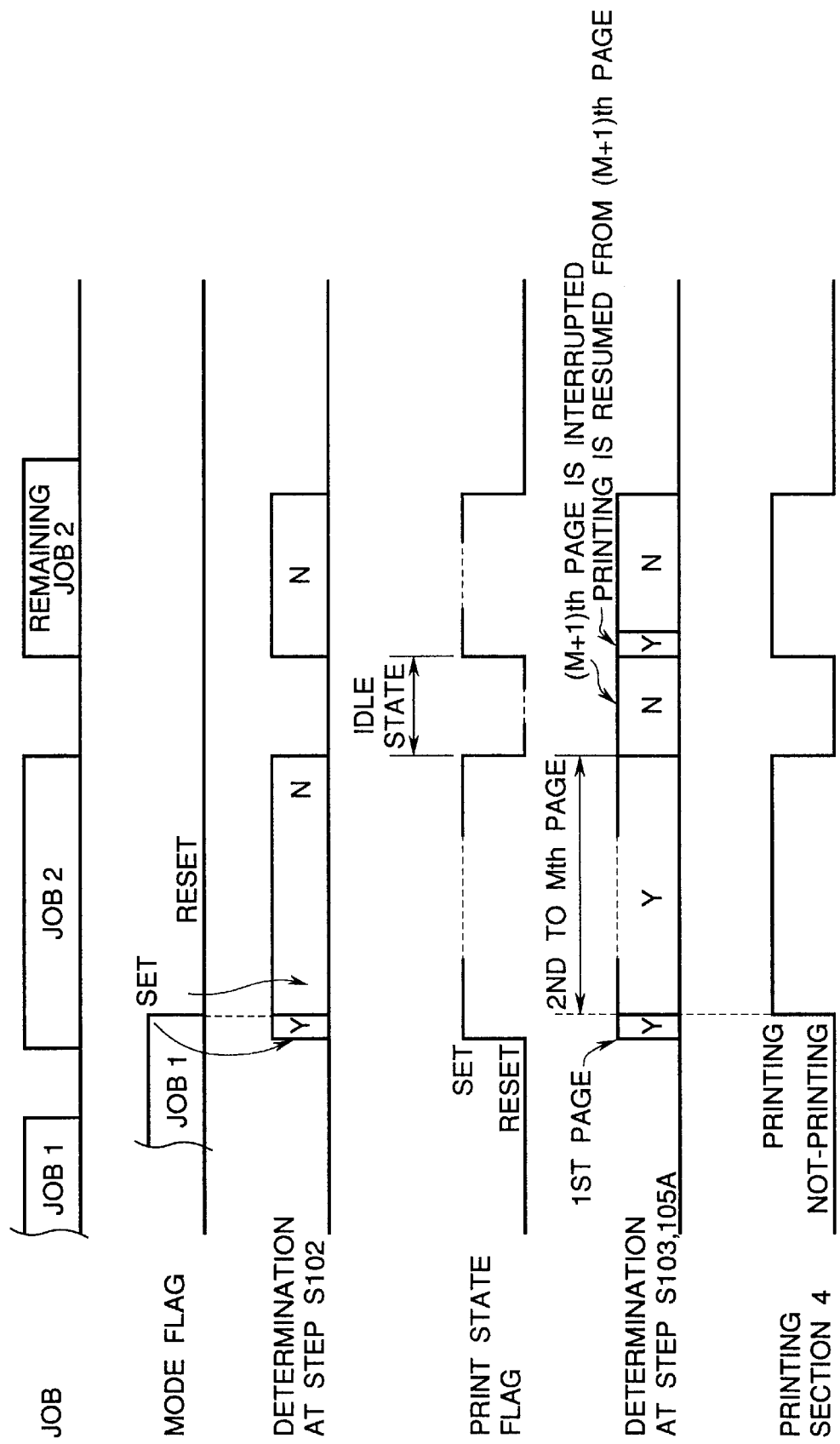

COLOR IMAGE PRINTER

BACKGROUND OF THE INVENTION

1. Field of the Invention

The present invention relates to a color image printing device for use in, for example, color printers, color copying machines, and color facsimile machines, and more particularly to a color image printing device constructed of a plurality of print engines which transfer toner images of corresponding colors one over the other to a print medium transported on a transporting device.

2. Description of the Related Art

Conventionally, a tandem type color image printer has been known where print engines of yellow, magenta, cyan, and black toner images are aligned along a transport path and the toner images are formed on corresponding photoconductive drums and transferred to a print medium one image over the other in register.

With this type of color image printing device, the print engines are spaced apart so that the print medium is be transported from one print engine to another. This is advantageous over a single photoconductive drum type color printer where the print medium have to be moved back and forth through the single photoconductive drum to transfer the toner images of the respective colors. Therefore, the tandem type printer improves printing speed. In addition, the transfer belt forms a flat, straight transport path, allowing transferring toner images to a thick print medium.

However, the aforementioned conventional color image recording devices suffer from the problem that the photoconductive drums are always in contact with the transport belt directly or with the print medium between the photoconductive drum and the transport belt and therefore the photoconductive drum and transport belt are subjected to wear.

In addition, even when only black toner image is to be printed, all of the print engines are driven. Therefore, toners not actually printed are subjected to mechanical stress. Such a mechanical stress results in shorter usable life of the toner.

SUMMARY OF THE INVENTION

An object of the invention is to provide a color printing apparatus where wear and tear of the photoconductive drum and transport belt are minimized.

Another object of the invention is to provide a color printing apparatus where toners are not subjected to excess mechanical stress.

A color image printing apparatus has a plurality of image forming sections with corresponding photoconductive drums on which images of different colors are formed. Each photoconductive drum has formed an image of a corresponding color of print data thereon. The images of the respective colors are then transferred onto print paper in register to form a color image.

Each of a plurality of positioning mechanisms selectively positions a corresponding photoconductive drum at an operative position and a non-operative position. A controlling section controls the positioning mechanism to switch the corresponding photoconductive drum between the operative position and the non-operative position. A color detecting section detects a color in each color plane of a page of the print data. When all of the plurality of positioning mechanisms have been brought to the non-operative positions, the controlling section selectively controls the positioning mechanisms in a first operation mode or in a second operation mode according to the color detected in the color plane by the color detecting section.

The first operation mode is a mode where when the color detecting section has detected a color in each color plane of a first page, the controlling section causes a positioning mechanism corresponding to the color detected by the color detecting section to the operative position, and when the color detecting section has detected a color in a page after the first page which corresponds to a photoconductive drum at the non-operative position, the controlling section causes the positioning mechanism of the photoconductive drum corresponding to the color detected by the color detecting section in the page after the first page to the operative position.

The first operation mode is a mode where if the color detecting section has detected black in each color plane of a first page, the controlling section causes a positioning mechanism to bring a photoconductive drum corresponding to black to bring to the operative position, if the color detecting section has detected any one of yellow, magenta, and cyan black in each color plane of a first page, the controlling section causes all of the positioning mechanisms to the operative positions.

The color image printing apparatus may include a counter which counts a number of times the color detecting section detects in successive pages that all colors in a preceding page are found in a following page. When the counter has counted up to the predetermined value, the controlling section causes positioning mechanisms to bring corresponding photoconductive drums to operative positions, the photoconductive drums corresponding to colors detected by the color detecting section.

The print data may be compressed and compared with compressed reference data so the color plane detecting section can detect respective colors at high speed.

The data converting section may output the bit map data simultaneously to the data detecting section and the data compressing section so that the data compressing section and the data detecting section concurrently operates, thereby increasing the throughput of the printer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 12 is a block diagram illustrating a general construction of a color printer according to a third embodiment of the invention;

FIG. 13A is a flowchart illustrating the operation of determining the drive-color in the bit map data, performed by the color image printer according to the third embodiment;

FIG. 20A is a flowchart illustrating the procedure for determining the drive-color, performed by a color image printer according to the sixth embodiment;

FIG. 20B is a timing chart illustrating the relation among relevant signals of the sixth embodiment.

DETAILED DESCRIPTION OF THE INVENTION

The present invention will be described in detail by way of embodiments with reference to the accompanying drawings.

First Embodiment

<Construction>

Figure 1:
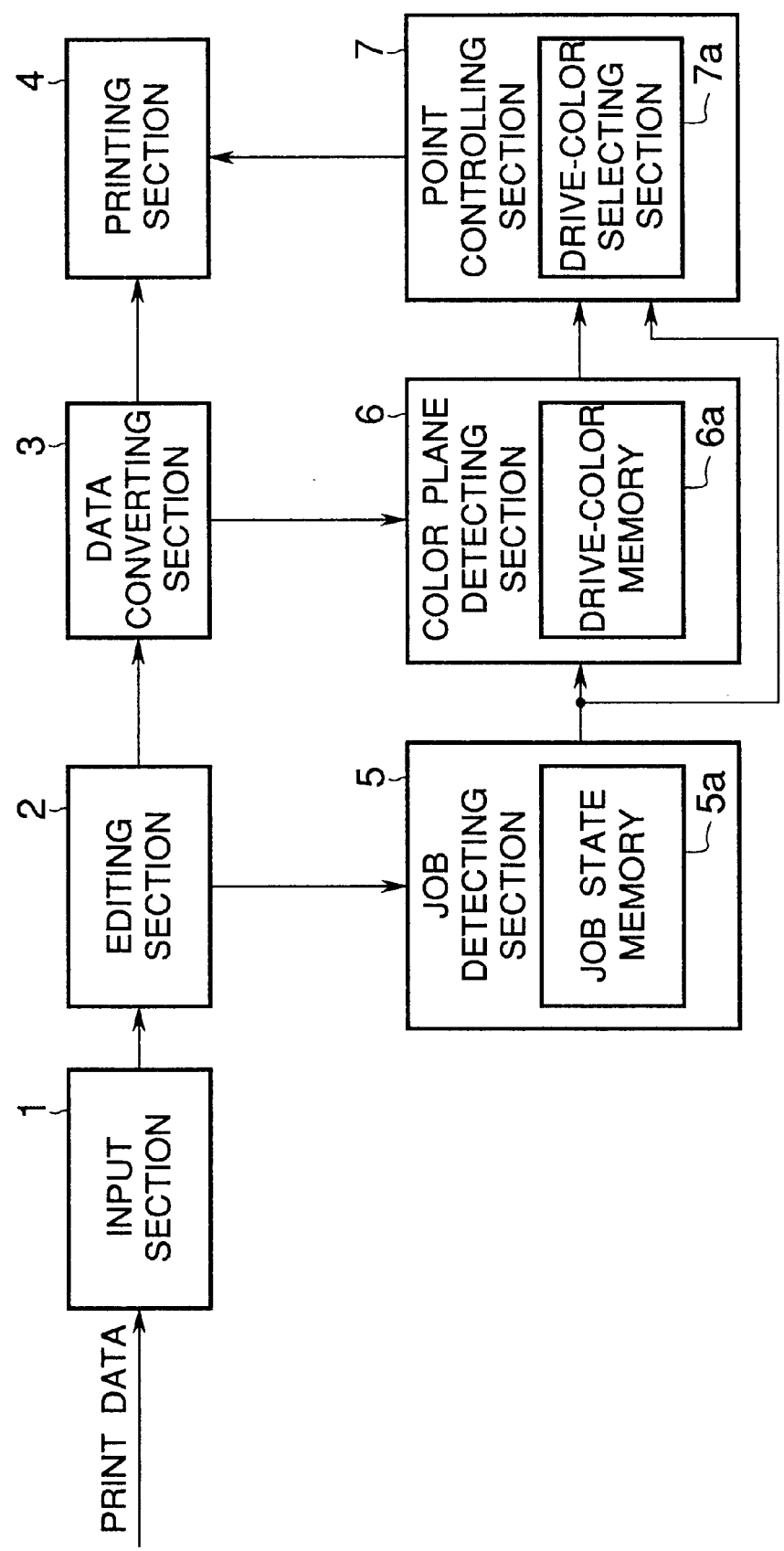
FIG. 1 is a block diagram showing a general configuration of a color image printer according to a first embodiment of the invention.

FIG. 1 is a block diagram showing a general configuration of a color image printer according to a first embodiment of the invention.

A host apparatus, not shown, transfers print data to the color printer via an input section 1. An editing section 2 receives the print data and edits the print data on a page-by-page basis. A data converting section 3 produces bit map data for each of yellow, magenta, cyan, and black planes from the print data edited on a page-by-page basis. A printing section 4 forms images of the respective colors on the basis of the respective bit map data, thereby printing full color images.

A job detecting section 5 detects job instructions (e.g., job-beginning instruction and job-ending instruction) contained in the print data directed to the editing section 2, and stores the detected job instructions into a job state memory section 5a. Upon detecting a job-beginning instruction, the job detecting section 5 sets a job state flag indicating that a job has been begun. Upon a job-ending instruction, the job detection section 5 resets the job state flag.

A color plane detecting section 6 has a drive-color memory 6a which stores current drive-colors in a CDC (Current Drive-Color) area and next drive-colors in an NDC (Next Drive-Color) area.

The current drive-color is a color required for the printing a current page and printed by an image forming section whose positioning mechanism 60 has been at its operative position. The next drive-color is a color required for printing the next page and will be printed by a print engine whose positioning mechanism 60 is at its non-operative position when the current page is being printed.

The color plane detecting section 6 checks bit map data on a page-by-page basis for each of primary colors in a corresponding color plane of the bit map data in order to determine whether the bit map data contains colors other than those that are currently stored in the CDC area. If a detected color by the color plane detecting section 6 is not found in the CDC area, then that color is stored as a next drive-color in the NDC area. For example, if the current drive-colors in the CDC area are yellow, cyan and black and the detected colors are yellow, magenta and black for the next page, then magenta is not found in the CDC area. Thus, magenta is stored as a next drive-color into the NDC area. After the current page have been printed, the next print color in the NDC area is added to the current drive-colors in the CDC area, thereby updating the current drive-colors so that the current drive-colors are now yellow, magenta, cyan, and black.

The color plane detecting section 6 also monitors the job state flag of the job state memory section 5a. If the job state flag is reset, the color plane detecting section 6 resets (erases) the current drive-colors stored in the CDC area and next-print colors stored in the NDC area.

A print controlling section 7 has a drive-color selecting section 7a and controls the operation of the printing section 4. The drive-color selecting section 7a checks the content of the NDC area of the drive-color memory 6a to determine whether a next drive-color(s) is found in the NDC area. If any next drive-color is found in the NDC area, the drive-color selecting section 7a brings a positioning mechanism 60 corresponding to that next drive color into the operative position.

Figure 2:
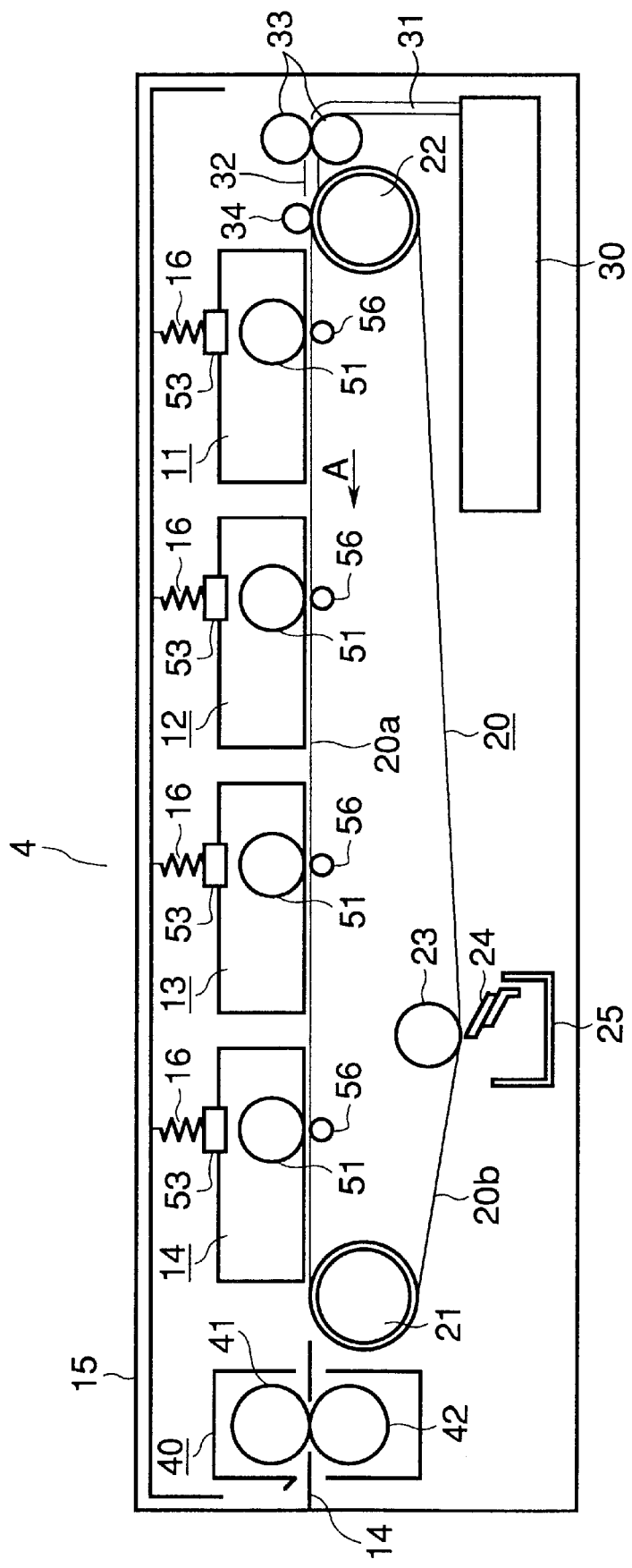
FIG. 2 is a cross-sectional view of the printing section of FIG. 1.

FIG. 2 is a cross-sectional view of the printing section of FIG. 1.

Referring to FIG. 2, there are provided yellow, magenta, cyan, and black image forming sections 11–14 in a tandem arrangement. The print image forming sections 11–14 form yellow, magenta, cyan, and black images, respectively. The image forming sections 11–14 are aligned in a direction shown by arrow B along a transport path through which a print medium travels.

The image forming sections 11–14 are of the LED electrophotographic type. Each of the image forming sections 11–14 includes a photoconductive drum 21, LED head 53 disposed over the photoconductive drum 51 to illuminate the photoconductive drum 51, and transfer roller 56 disposed under the photoconductive drum 51. The LED heads 53 of the image forming sections 11–14 receive yellow, magenta, cyan, and black bit map data from the data converting section 3.

Disposed between the photoconductive drums 51 and transfer rollers 56 of the print engines 11–14 is an upper half portion 20a of an endless belt 20 that runs on a driven roller 22 and a tension roller 23. The tension roller 23 is urged downwardly by urging means, not shown, against the endless belt 20 to hold the endless belt 20 taut.

A paper feeding section 30 is located at a lower right area of the printing section engine 4. The paper feeding section 30 feeds recording paper stored in a paper cassette, not shown, to registry rollers 33 via a feeding chute 31, the recording paper being fed page by page. The recording paper fed to the registry rollers 33 is then advanced via a transport path 32 to the endless belt 20. An attraction roller 34 is disposed over the driven roller 22 and is in pressure contact with the endless belt 20 to urge the endless belt 20 against the driven roller 22. The attraction roller 34 is made of, for example, a semiconductive rubber material having a high resistance, and causes the recording paper to be charged so that the recording paper is firmly attracted to the endless belt 20 with the aid of Coulomb force. Sensors, not shown, are provided along the transport path 32 to detect the leading edge of the recording paper.

The endless belt 20 is made of, for example, a high resistance semiconductive plastic film. The resistance is selected such that the recording paper is sufficiently attracted thereto when the recording paper is fed, and the residual charges are automatically neutralized when the recording paper is separated from the endless belt 20.

The recording paper travels through the image forming sections 11–14 while being attracted to the endless belt 20, so that the respective color images are transferred onto a page of recording paper one over the other in register. When the recording paper reaches the drive roller 21, the recording paper is separated from the endless belt 20. A neutralizer, not shown, is disposed in such a way that the endless belt 20 lies between the neutralizer and drive roller 21. After images of the respective colors have been transferred onto the recording paper, the neutralizer neutralizes the recording paper so that the recording paper separates from the endless belt 20 without difficulty. A sensor, not shown, is provided downstream of the neutralizer along the transport path to detect the trailing end of the recording paper.

The recording paper which has been separated from the endless belt 20 is then advanced to a fixing unit 40 which includes a heat roller 41 and a pressure roller 42. The recording paper is pulled in between the heat roller 41 and the pressure roller 42, so that the toner images on the recording paper is fused and then discharged to a paper stacker, not shown.

A cleaning blade 24 is provided below the tension roller 23 and opposes the tension roller 23. The free end of the cleaning blade 24 abuts the lower surface of the lower half 20b of the endless belt 20. The cleaning blade 24 is made of, for example, a flexible rubber material or plastic material and scratches off the toner left on the surface of the endless belt 20.

The scratched toner is collected in a waste toner tank provided under the cleaning blade 24.

The image forming sections 11–14 are of the same construction, and therefore only the image forming section 11 for yellow image will be described, by way of example, with reference to FIGS. 3, 4, and 5.

Figure 3:
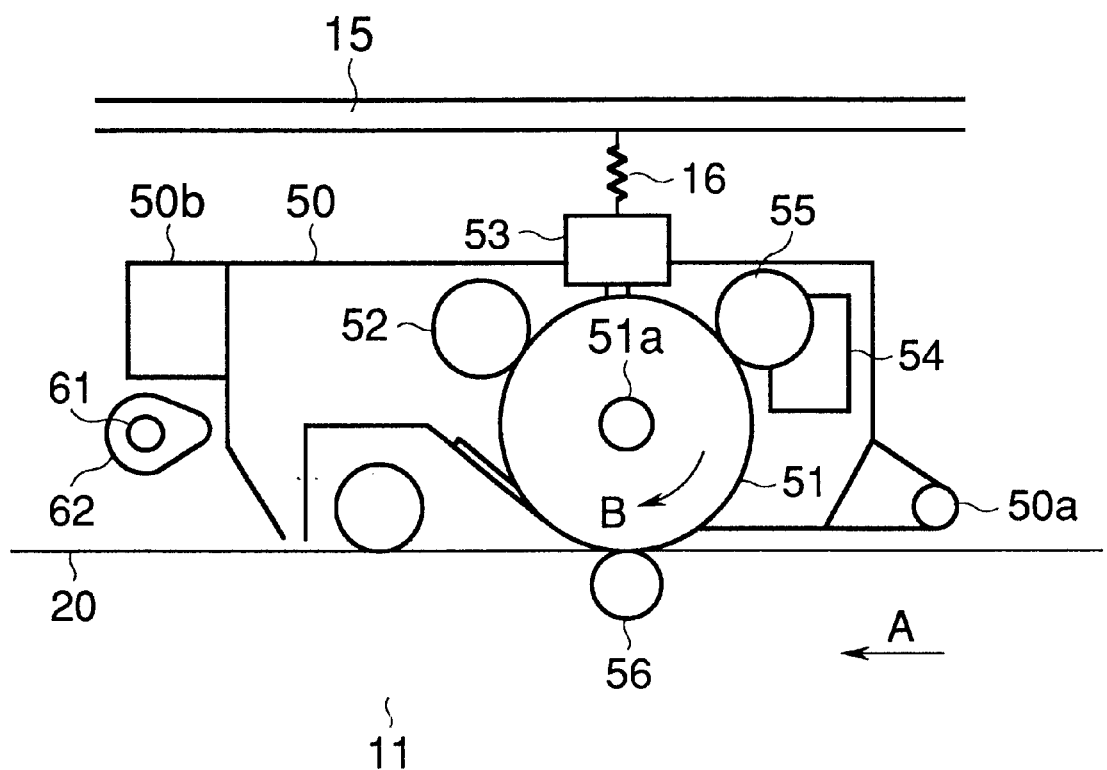
FIG. 3 is a cross-sectional view showing a relevant portion of the image forming section 11 of FIG. 2.

FIG. 3 is a cross-sectional view showing a relevant portion of the image forming section 11 of FIG. 2.

Figure 4:
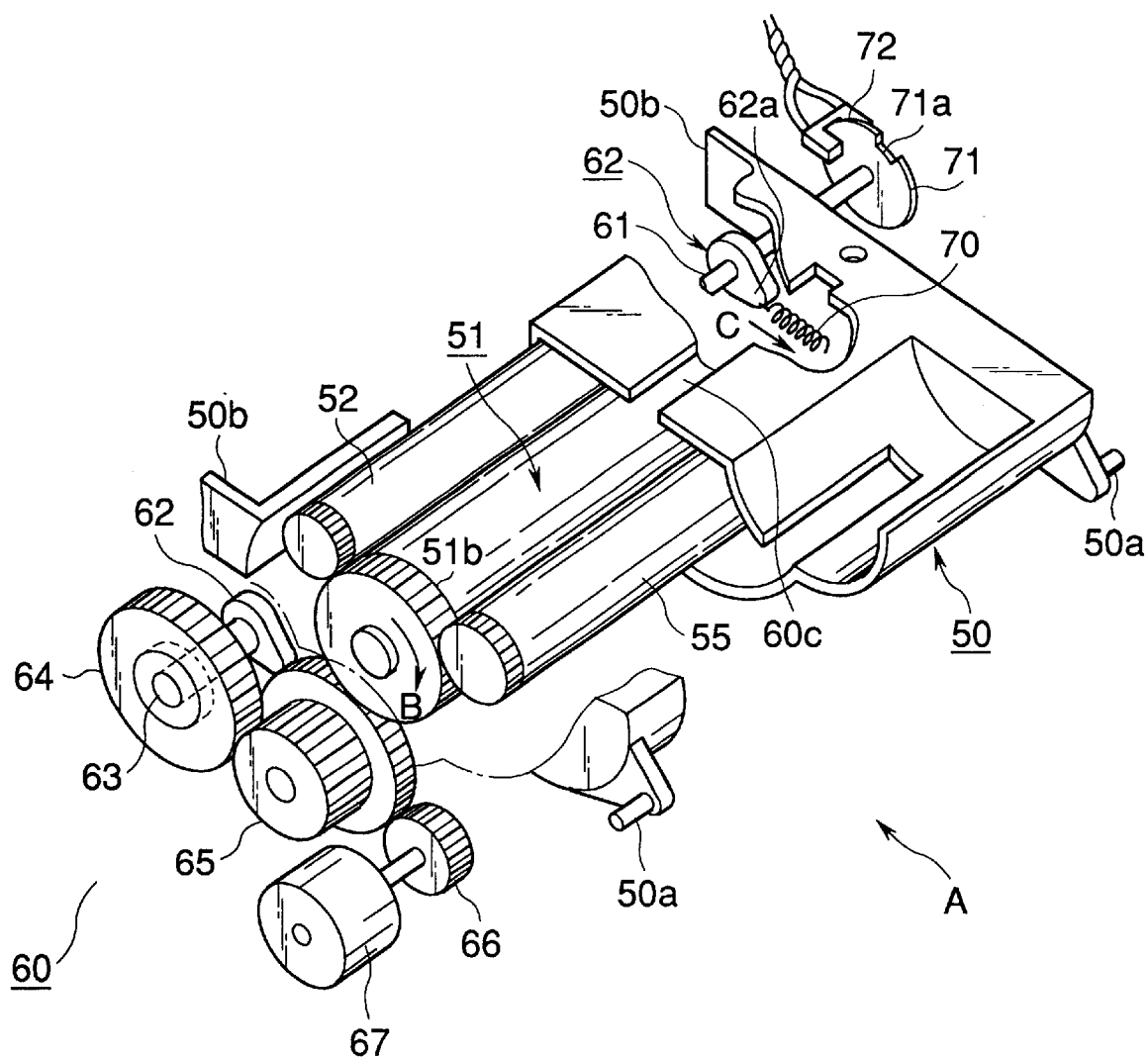
FIGS. 4 and 5 are perspective views of a relevant portion of the print engine of FIG. 2.
Figure 5:
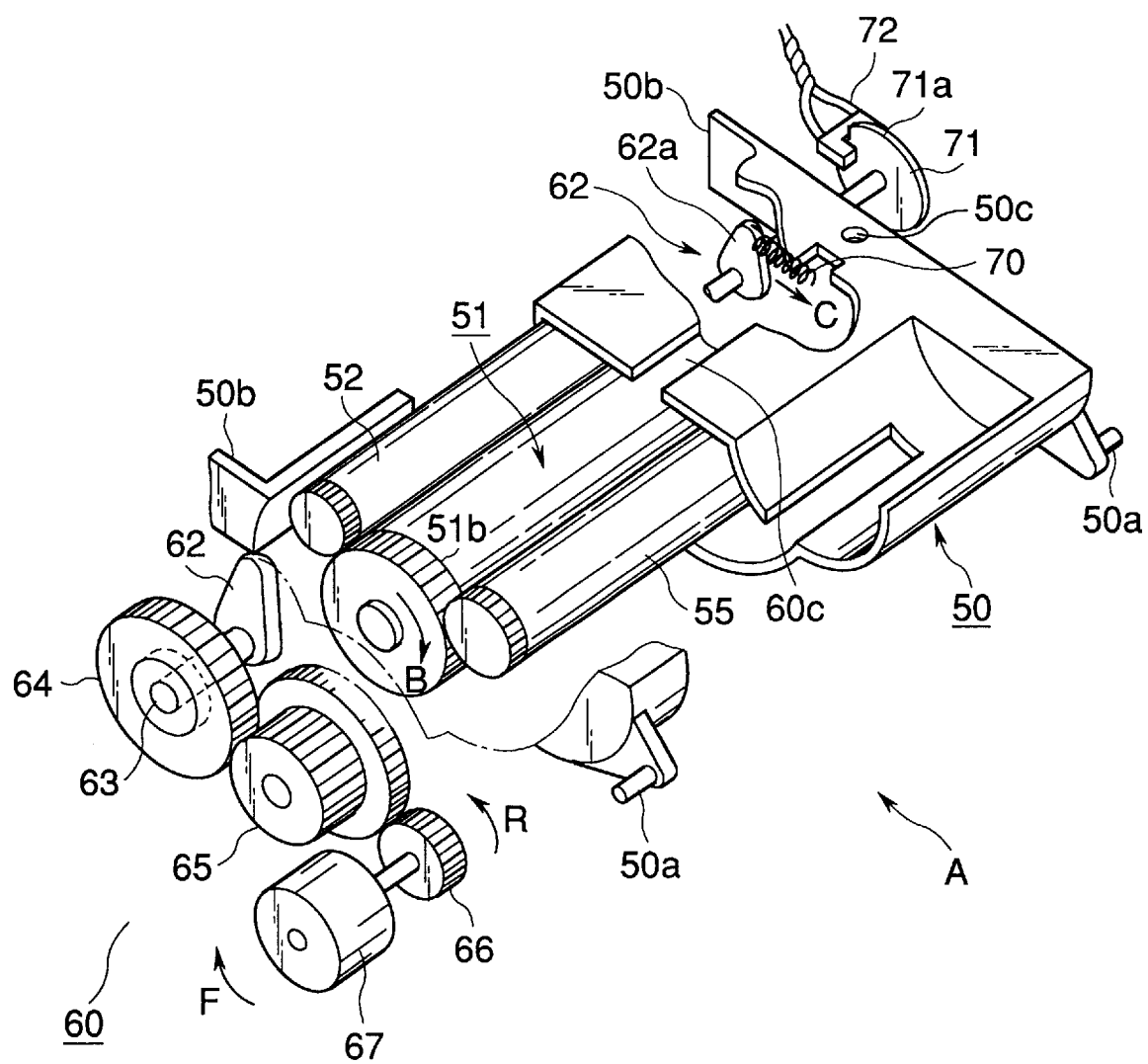

FIGS. 4 and 5 are perspective views of a relevant portion of the print engine of FIG. 2. FIG. 4 shows the photoconductive drum 51 when it is in its operative position and FIG. 5 shows the photoconductive drum 51 when it is in its non-operative position.

Referring to FIG. 3, the photoconductive drum 11 rotates about an axis 51a in a direction shown by arrow B. Disposed around the photoconductive drum 11 are a charging roller 52, an LED head 53, a developing unit 54 having a roller 55, and a transfer roller 56 in this order. The photoconductive drum 51, charging roller 52, and developing unit 54 are supported on a frame 50. The LED head 53 is suspended by means of a spring 16 from an upper cover 15 of the body of the printing section 4. When the upper cover is closed, the frame 50 receives the LED head 53 so as to position the LED head 53 relative to the photoconductive drum 51. When the upper cover 15 is opened, the LED head 53 moves away from the frame 50, so that the service personnel can access the frame 50 for replacement. The frame 50 is detachably mounted to the body of the printing section 40.

The charging roller 52 uniformly charges the surface of the photoconductive drum 51. The LED head 53 has LED arrays, not shown, whose light emitting diodes are selectively energized in accordance with the bit map data of yellow image input thereto to illuminate the surface of the photoconductive drum 51, thereby forming an electrostatic latent image on the photoconductive drum 51. The developing unit 54 has a toner tank, not shown, which holds yellow toner therein. The toner is supplied from the toner tank to the developing roller 55, which in turn deposits the toner to the electrostatic latent image by Coulomb force, thereby developing the electrostatic latent image into a yellow toner image. The yellow toner image is then transferred to the recording paper by the transfer roller 56.

As shown in FIGS. 3–5, the frame 50 has projections 50a formed at its end on the upstream side of the transport path. The projections 50a are rotatably received in grooves, not shown, formed in the body of the printing section 4, so that the printing section 4 can be rotated about the projections 50a. The frame 50 has a flat projection 50b formed at its end on the downstream side of the transport path. Eccentric cams 62 are fixedly mounted on both end portions of a cam shaft 61 rotatably supported on the printing section 4. The cams 62 are disposed so that the cam surface opposes the flat projections 50b.

The frame 50 is urged downwardly by the spring 16 that urges the LED head 53 against the frame 50. When the cam shaft 61 is rotated, the cams 62 rotate to push up the flat projections 50b against the downward urging force of the spring 16, so that the frame 50 rotates clockwise about the projections 50a in accordance with the eccentricity of the cams 62. The cam shaft 61 is provided with a gear 64 having a one-way bearing 63 assembled therein. The gear 64 is in mesh with a motor gear 66 fixed to the rotating shaft of a motor 67 via a double gear 65. The cam shaft 61, cams 62, one-way bearing 63, gear 64, double gear 65, motor gear 66, and motor 67 form a positioning mechanism 60.

The positioning mechanism 60 causes the frame 50 to pivot about the projections 50a so that the frame 50 moves relative to the endless belt 20 between the operative position and the non-operative position.

FIG. 4 shows the frame 50 at the operative position. When the frame 50 is at the operative position, the double gear 65 is in mesh with the gear 51b of the photoconductive drum 51. When the motor 67 rotates clockwise (shown by arrow F) at a constant speed, the photoconductive drum 51 also rotates at a constant speed in the direction shown by arrow B. The gear 64 also rotates but the cam shaft 61 and cams 62 will not rotate since the one-way bearing 63 rotates freely. A spring 70 is mounted between one of the eccentric cams 62 and the body of the printing section 4, and urges the cam 62 so that the large-radius portion 62a is oriented in a direction shown by arrow C.

FIG. 5 shows the frame 50 at the non-operative position.

When the motor 67 rotates counterclockwise (shown by arrow R), the one-way bearing 63 is locked so that the cam shaft 61 and cams 62 rotate against the urging force of the spring 70. As a result, the frame 50 is pivoted clockwise about the projections 50a so that the double gear 65 moves out of meshing engagement with the gear 51b of the photoconductive drum 51, thereby moving into the non-operative position shown in FIG. 5.

The cam shaft 61 has a slit disc 71 having a slit 71a formed therein. When the cam shaft 61 rotates, a photosensor 72 detects the slit 71a, thereby detecting the angular position of the cam 62. The frame 50 has a window 60c formed therein which receives the LED head 53 to place the LED head 53 in position relative to the photoconductive drum 51.

<Overall Operation>

The operation of the color image printer according to the first embodiment will be described.

Before the color image printer is powered on, the some or all the positioning mechanisms 60 are at the operative position. Upon power up, the print controlling section 7 initializes the respective sections of the printing section 4. The heater in the heat roller 41 is energized so that the heat roller 41 is set to a pre-selected temperature.

The drive-color selecting section 7a causes the motors 67 of the image forming sections 11–14 to rotate in the reverse directions shown by arrow R. At each image forming section, the one-way bearing 63 is locked so that the cams 62 rotate against the urging force of the spring 70. The frames 50 is pivoted clockwise about the projection 50a so that the double gear 65 moves out of meshing engagement with the gear 61b of the photoconductive drum 51. As a result, the photoconductive drum 51 moves out of engagement with the endless belt 20.

The large radius portion 62a of the cam 62 rotates till it is oriented upward where the frame 50 is at the non-operative position. Then, the photosensor 72 detects the slit 71a formed in the slit disc 71, causing the motor 67 to stop so that the frame 50 is held at the non-operative position.

Then, the drive-color selecting section 7a reads the current drive-colors stored in the CDC area of the drive-color memory 6a, and drives the positioning mechanisms 60 of the image forming sections corresponding to the current drive-colors, thereby bringing the positioning mechanism 60 to their operative positions. The print color selecting section 7a causes the motors 67 of corresponding image forming sections to rotate-in the forward direction (shown by arrow F). The rotation of the motors 67 is transmitted via the motor gear 66, double gear 65, and gear 51b to the gear 64. However, the one-way bearing 63 rotates freely so that the rotation is not transmitted to the cam shaft 61 and cams 62.

The large radius portion 62a of the cam 62 is biased by the spring 70, so that the cam shaft 61 and cams 62 rotate in such a direction as to lock the one-way bearing 63 till the large radius portion 62a is oriented in the direction shown by arrow C. Therefore, the frame 50 is also pivoted counterclockwise about the projections 50a by the urging force of the sprint 70 till the photoconductive drum 51 is in pressure contact with the endless belt 20 and the gear 51b of the photoconductive drum 51 moves into meshing engagement with the double gear 65. The motor 67 stops where the frame 50 abuts a stopper, not shown, of the body of the printing section 4. The image forming section is now ready to be driven for printing operation.

Thus, if the photoconductive drums of image forming sections are not of colors required for printing a page, the photoconductive drums are moved out of contact engagement with the endless belt 20, thereby alleviating the mechanical deterioration of the printer due to the friction between the photoconductive drum 51 and the endless belt 20. This operation provides a prolonged life of the photoconductive drum 51 and the endless belt 20 and reduces chance of toner deteriorating due to mechanical stresses, providing a prolonged life of toner which is essential for good print quality for a longer period of time.

When the positioning mechanism 60 brings a photoconductive drum 51 into or out of contact with the endless belt 20, mechanical vibrations occur and are transmitted to other image forming sections to cause deterioration of the resulting print quality. For this reason, the positioning mechanism should be brought to the operative position or the non-operative position with the endless belt 20 completely stopped.

Meanwhile, the drive-colors can vary from page to page. If drive-colors are detected on a page-by-page basis and the positioning mechanisms for image forming sections are driven in accordance with the detected drive-colors, then the image forming sections are frequently switched between the operative positions and the non-operative positions. This reduces the throughput in printing.

For this reason, the color printer according to the first embodiment is provided with the job detecting section 5, color plane detecting section 6, and drive-color selecting section 7a. These sections cooperate to control the positioning mechanisms 60 of the respective image forming sections 11–14.

<Printing operation>

Upon power up, the job detecting section 5, color plane detecting section 6, and print controlling section 7 are initialized. The job state flag of the job state memory 5a in the job detecting section 5 is reset. The current drive-colors in the CDC area and the next drive-colors in the NDC area of the drive-color memory 6a are reset, respectively, so that there is currently no drive-color stored in the drive-color memory 6a. Then, the drive-color selecting section 7a controls the positioning mechanisms 60 to bring all of the respective image forming sections 11–14 to the non-operative positions.

Figure 6:
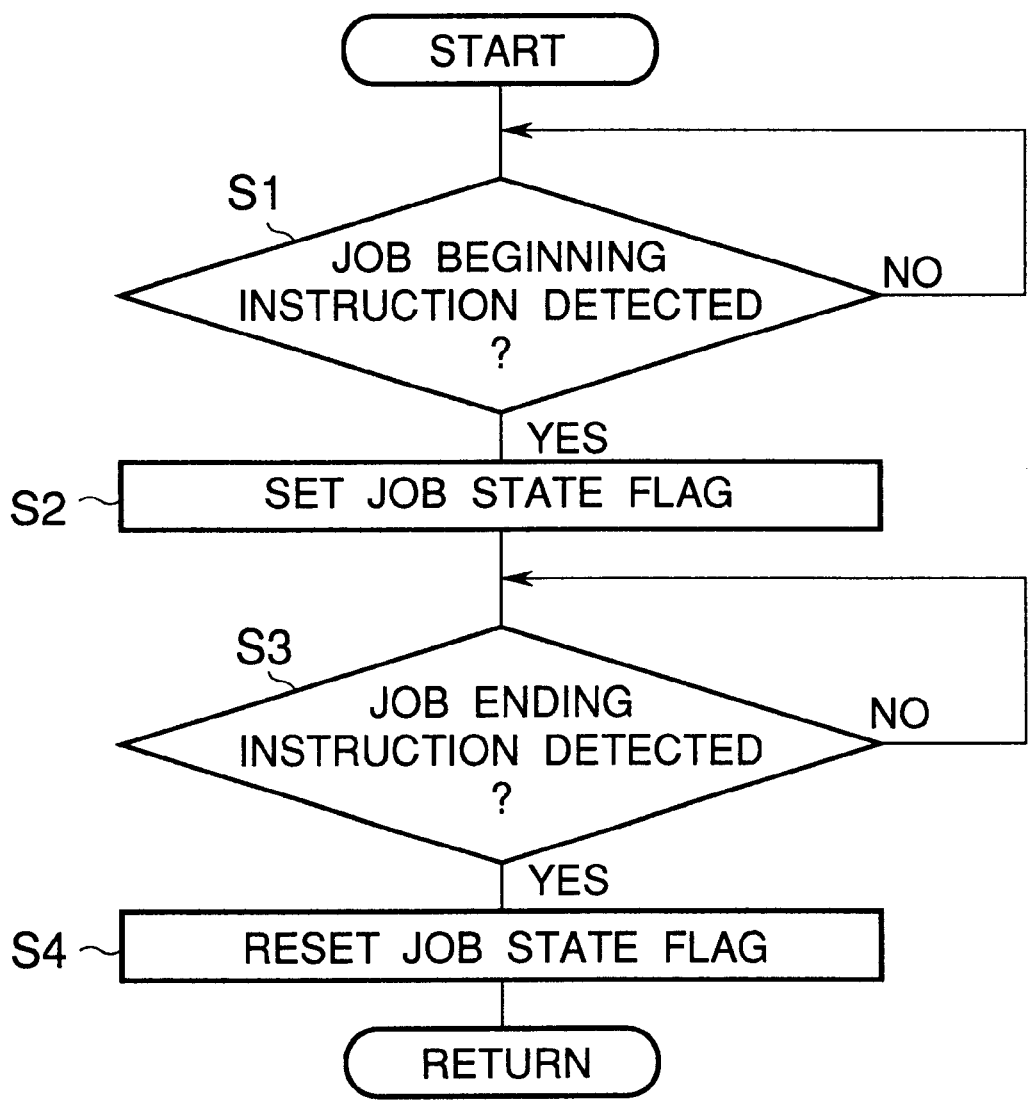
FIG. 6 is a flowchart illustrating the procedure for detecting a job instruction of the first embodiment.
Figure 7:
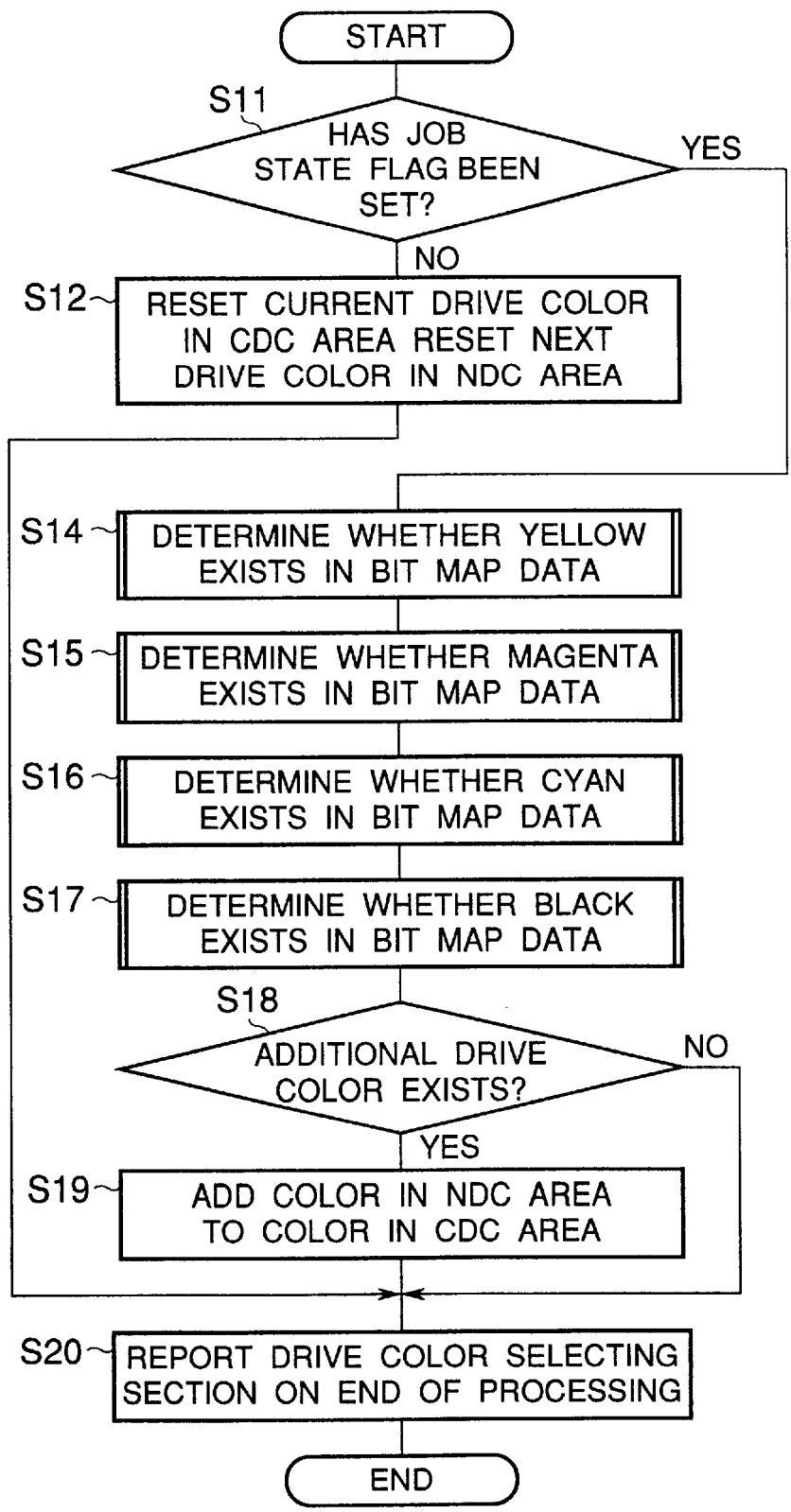
FIG. 7 is a flowchart illustrating the procedure for detecting drive-colors.

FIG. 6 is a flowchart illustrating the procedure for detecting a job instruction, performed by the job detecting section 5. First, the job detecting section 5 enters a standby state after initial set up, waiting for a job beginning instruction (step S1) of a job. When the job detecting section 5 detects a job beginning instruction, the job state section 5 sets the job state flag (step S2). Then, the program proceeds to step S3 where the job detecting section 5 waits for a job ending instruction (step S3). After step S2, the steps S14–S20 in the flowchart shown in FIG. 7 are carried out for each page of the print data of the job. After having performed the steps S14–S20 for the final page of the print data, the job ending instruction is detected at step S3.

Upon detecting a job ending instruction in the print data, the job state flag in the job state memory 5a is reset (step S4). The printer proceeds to RETURN, waiting for the next job. In this manner, the steps S1–S4 are executed for each job.

FIG. 7 is a flowchart illustrating the procedure for detecting drive-colors. The steps in the flowchart shown in FIG. 7 are carried out between steps S2 and S3 in FIG. 6. It is assumed that the data converting section 3 has converted the print data for a page into bit map data.

At step S11, a check is made to determine whether the job state flag has been set; if the answer is YES, then the program proceeds to step S14 and if the answer is NO, the program proceeds to step S12 where the color plane detecting section 6 resets the current drive-colors in the CDC area and the next drive-colors in the NDC area of the drive-color memory 6a.

A check is made at step S14 to determine whether the bit map data contains "yellow." If "yellow" exists in the bit map data but is not found in the CDC area, then "yellow" is stored into the NDC area.

Likewise checks are made at steps S15, S16, and S17 to determine whether the bit map data contains magenta, cyan, and black, respectively. The respective colors (magenta, cyan, and black) are stored into the NDC area if they are detected in the bit map data but are not found in the CDC area. A detailed operation of each of steps S14–S17 are will be described later with reference to FIG. 8.

After performing steps S14–S17, the program proceeds to step S18 where the drive-color selecting section 7a checks the NDC area of the drive-color memory 6a to determine whether the NDC area contains a drive-color which is not found in the CDC area. If, at step S18, a color in the CDC area is not found in the CDC area, then that color is added into the CDC area at step S19 and then the program informs the drive-color selecting section 7a of the completion of the color detecting procedure performed by the color detecting section 6. Thus, an image of the additional drive-color is formed in accordance with the bit map data of that color and then transferred to the print medium.

If it is determined at step S18 that colors in the NDC area are all found in CDC area, the program proceeds to step S20.

Steps S14–S17 shown in FIG. 7 performed by the color plane detecting section 6 differ only in color.

Figure 8:
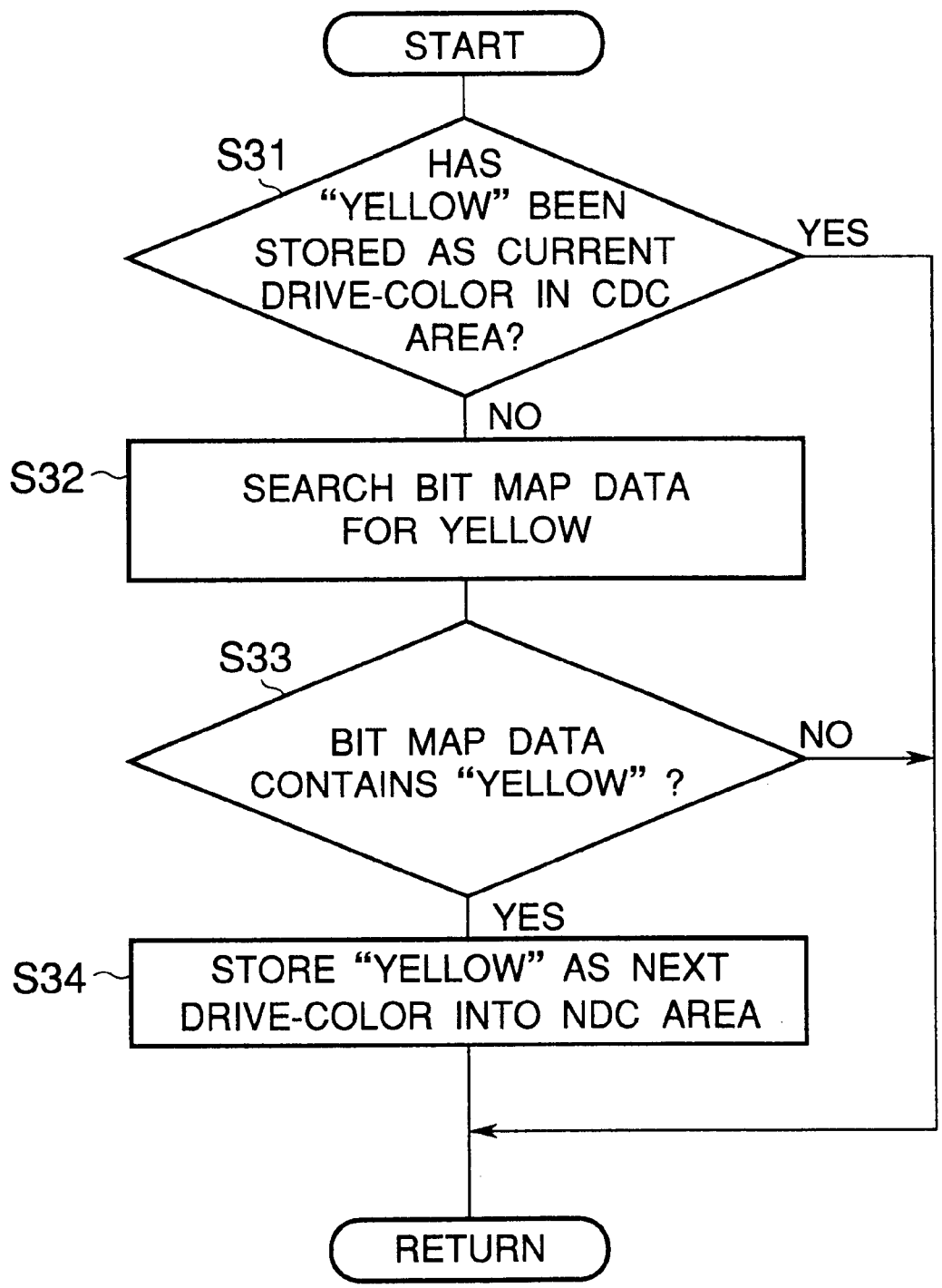
FIG. 8 is a flowchart illustrating, by way of example, the procedure for "yellow" performed at step 14.

FIG. 8 is a flowchart illustrating, by way of example, the procedure for "yellow" performed at step 14.

The drive-color selecting section 7a checks the content of the memory 6a to determine whether "yellow" exists as a current drive-color in the CDC area (step S31); if the answer is NO, then the program proceeds to step S32 where the bit map data is searched for "yellow." Then, a check is made to determine whether "yellow" exists in the bit map data (step S33).

If the answer is YES at step S33, then "yellow" is stored as a next drive-color into the NDC area (step S34). If it is determined at step S33 that "yellow" is not found in the bit map data, the program returns.

The procedure shown in FIG. 8 is repeated for "magneto," "cyan," and "black" on a page-by-page basis but there are many cases in which the answer is YES at step S31 after the first page of a job and steps S32–S34 are not carried out. In other words, all colors in the print data of a job are not searched on a page-by-page basis.

After having carried out the flowchart of FIG. 7 for each page, the color selecting section 7a brings positioning mechanisms 60 corresponding to the current drive-colors in the CDC area and the print section 4 starts printing.

<Advantages of the First Embodiment>

In the first embodiment, the positioning mechanisms of the respective image forming sections are not switched between the operative positions and the non-operative positions on a page-by-page basis. Instead, once the positioning mechanism of an image forming section for a particular drive-color is brought to its operative position, the positioning mechanism for that color remains at the operative position for all of the following pages during the same job. For example, the first page contains yellow, cyan, and black but magenta, then the positioning mechanisms of yellow, cyan, and black are brought to their operative positions but the positioning mechanism of magenta is left at its non-operative position. Then, if the second page contains yellow, magenta, cyan, and black, then the positioning mechanism for magenta is brought to its operative position while the positioning mechanisms of yellow, cyan, and black remain at their operative positions. If the third page does not contain, for example, yellow and magenta, then the positioning mechanisms of yellow, magenta, cyan, and black remain at their operative position.

This way of positioning the image forming sections at their operative and non-operative positions minimizes the frequency of switching the positioning mechanisms between their operative positions and non-operative positions, thereby reducing the significant influence of such frequent switching on the throughput of the printer during printing operation.

It is to be noted that if the answer is YES at step S31 in FIG. 8, it is not required to detect any other colors in the bit map data. This speeds up the color detecting operation without adversely affecting the throughput of the printer during printing operation.

Upon detecting a job-ending instruction at step S3 in FIG. 6, the job detecting section 5 resets the job state flag, the color plane detecting section 6 resets the current drive-color in the CDC area and the next drive-color in the NDC area of the drive-color memory 6a, and the drive-color selecting section 7a causes the positioning mechanisms 60 of the image forming sections 11–14 to be brought to the non-operative positions which are initial positions. This allows the positioning mechanisms 60 to be brought to the non-operative positions on a job-by-job basis, preventing the photoconductive drums 51 from being left in contact with the endless belt 20, and alleviates the mechanical wear and tear of the image forming sections 11–14 and the endless belt 20, preventing the toner from being deteriorated due to mechanical stresses. This is advantageous since the number of colors required in printing vary from job to job, depending on the kind of image, e.g., black-and-white image, two-color image, full-color image, and so on. The polarity of the job state flag of the job detecting section 5 may be reversed-so that print data exists when the job state flag is reset, and does not exist when the job state flag is set when a job beginning instruction has been detected.

Second Embodiment

<Construction>

Figure 9:
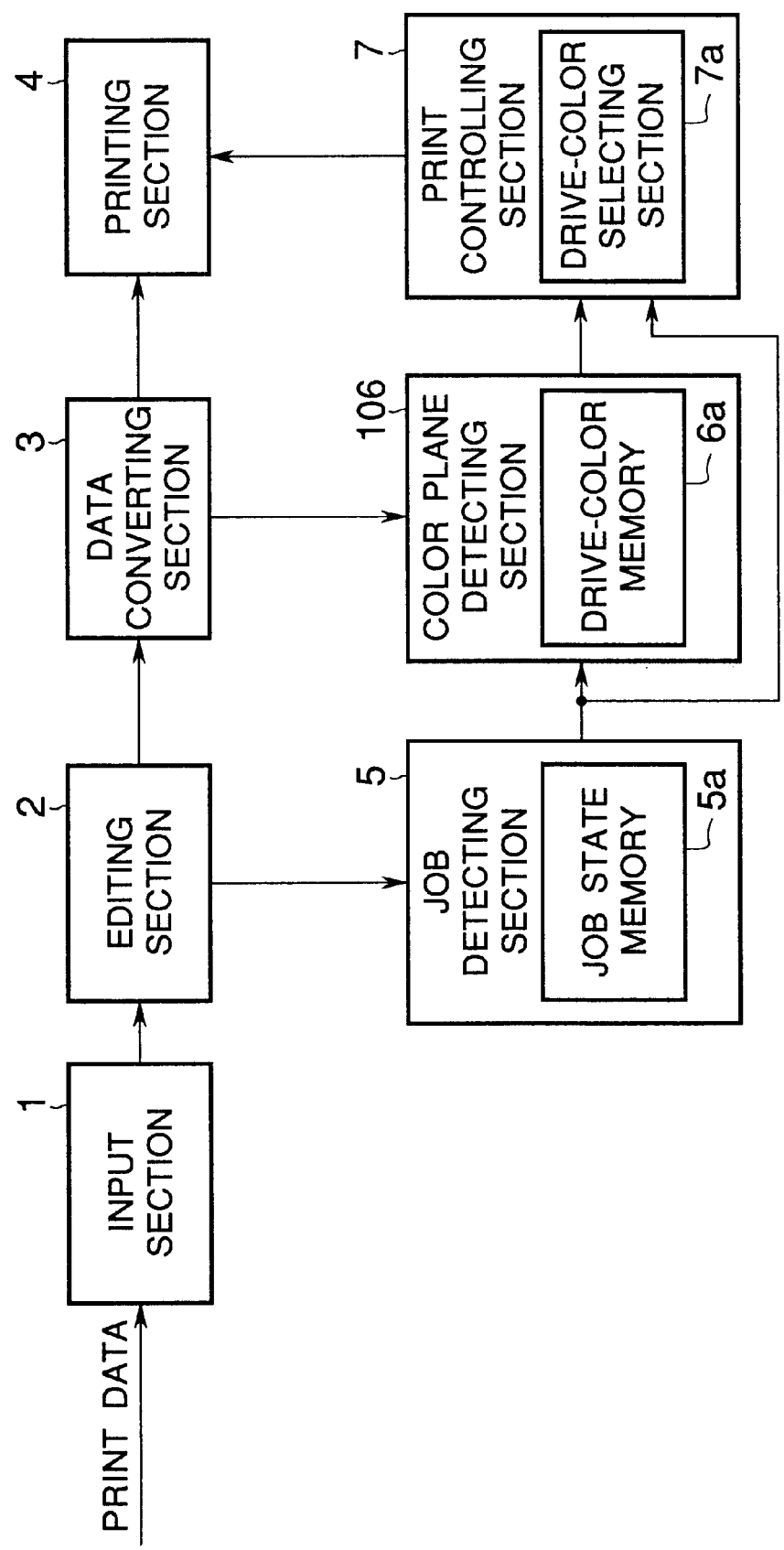
FIG. 9 is a block diagram showing a general construction of a color image printer according to a second embodiment of the invention.

FIG. 9 is a block diagram showing a general construction of a color image printer according to a second embodiment of the invention.

The second embodiment differs from the first embodiment in that a color plane detecting section 106 is used in place of the color plane detecting section 6. Elements similar to those in the first embodiment have been given like reference numerals and the description thereof is omitted.

The color plane detecting section 106 includes a drive-color memory 6a which has a CDC (Current Drive-Color) area and a NDC (Next Drive-Color) area. The next drive-color is stored in the CDC area and the current drive-colors are stored in the CDC area.

The color plane detecting section 106 checks the bit map data for a color which is not found in the CDC area.

If any one of yellow, magenta, and cyan is detected in the bit map data for the next page but is not found in the CDC area, then all of the colors (i.e., yellow, magenta, cyan, and black) are stored as a next drive-color into the NDC area. Then, the colors in the NDC area are then added as a current drive-color into the CDC area after the current page has been printed.

If the color plane detecting section 106 detects none of yellow, magenta, and cyan in the bit map data, then only black is stored as a next drive-color into the NDC area. Then, the content of the NDC area is added as a current drive-color into the CDC area after the current page has been printed.

In other words, in the first embodiment, if a detected drive-color is not found in the CDC area, then that color is added to the drive-colors in the CDC area and a positioning mechanism 60 corresponding to the added color is brought to the operative position. In the second embodiment, If only black is detected in the first page, only the positioning mechanism 60 of the black image forming section 11 is brought to the operative position. Then, if any one of yellow, magenta, and cyan is detected in any one of succeeding pages, the positioning mechanisms of all of the yellow, magenta, cyan, and black image forming sections 11–14 are brought to the operative positions.

The color plane detecting section 6 monitors the job state flag of the job state memory 5a. When the job detecting section 5 resets the job state flag of the job state memory 5a, the color plane detecting section 106 resets (erases) the current drive-colors in the CDC area and the next print colors in the NDC area.

<Operation>

Just as in the first embodiment, upon power-up of the printer, the contents in the CDC area and the NDC area reset and the print controlling section 7 causes the positioning mechanism 60 to bring all of the image forming sections to the non-operative positions.

The procedure for detecting a job instruction is performed by the job detecting section 5 in the same way as shown in FIG. 6 of the first embodiment, therefore reference is made to FIG. 6 and description thereof for detailed operation.

Figure 10:
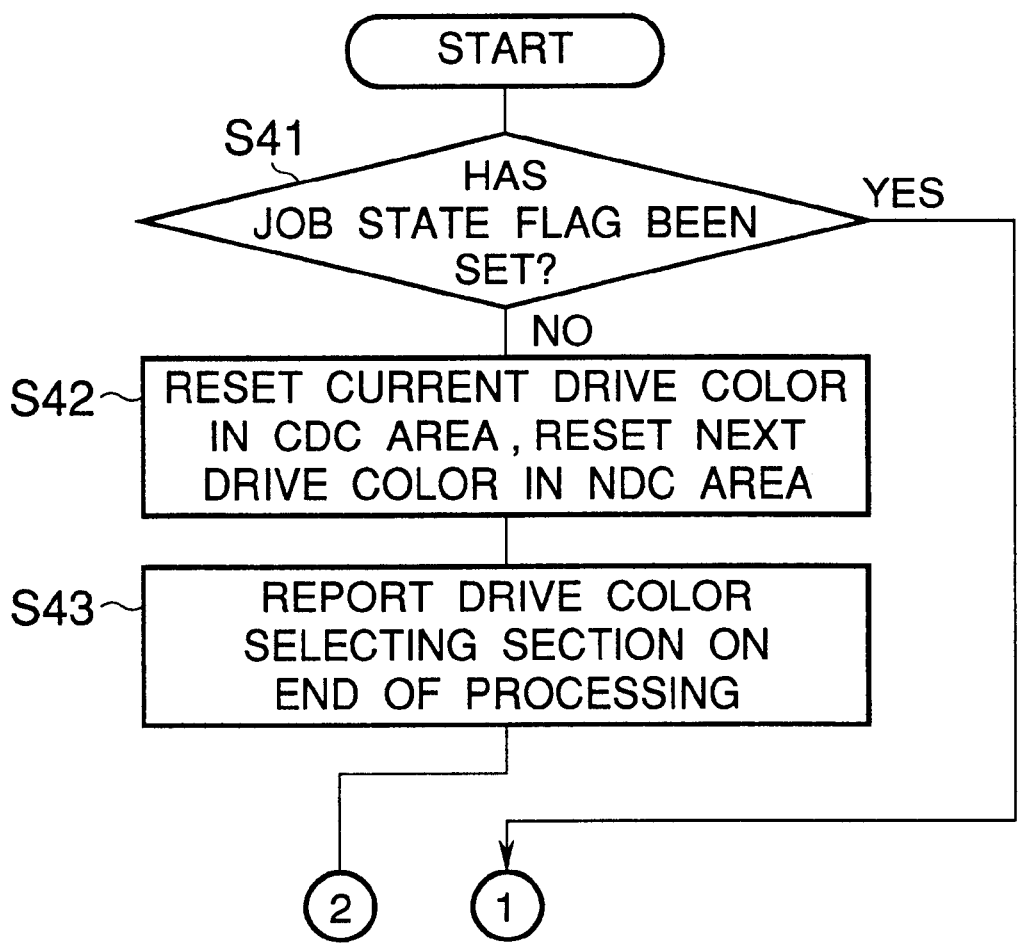
FIGS. 10 and 11 are flowcharts illustrating the procedure for determining a drive-color of a color printer according to the second embodiment.
Figure 11:
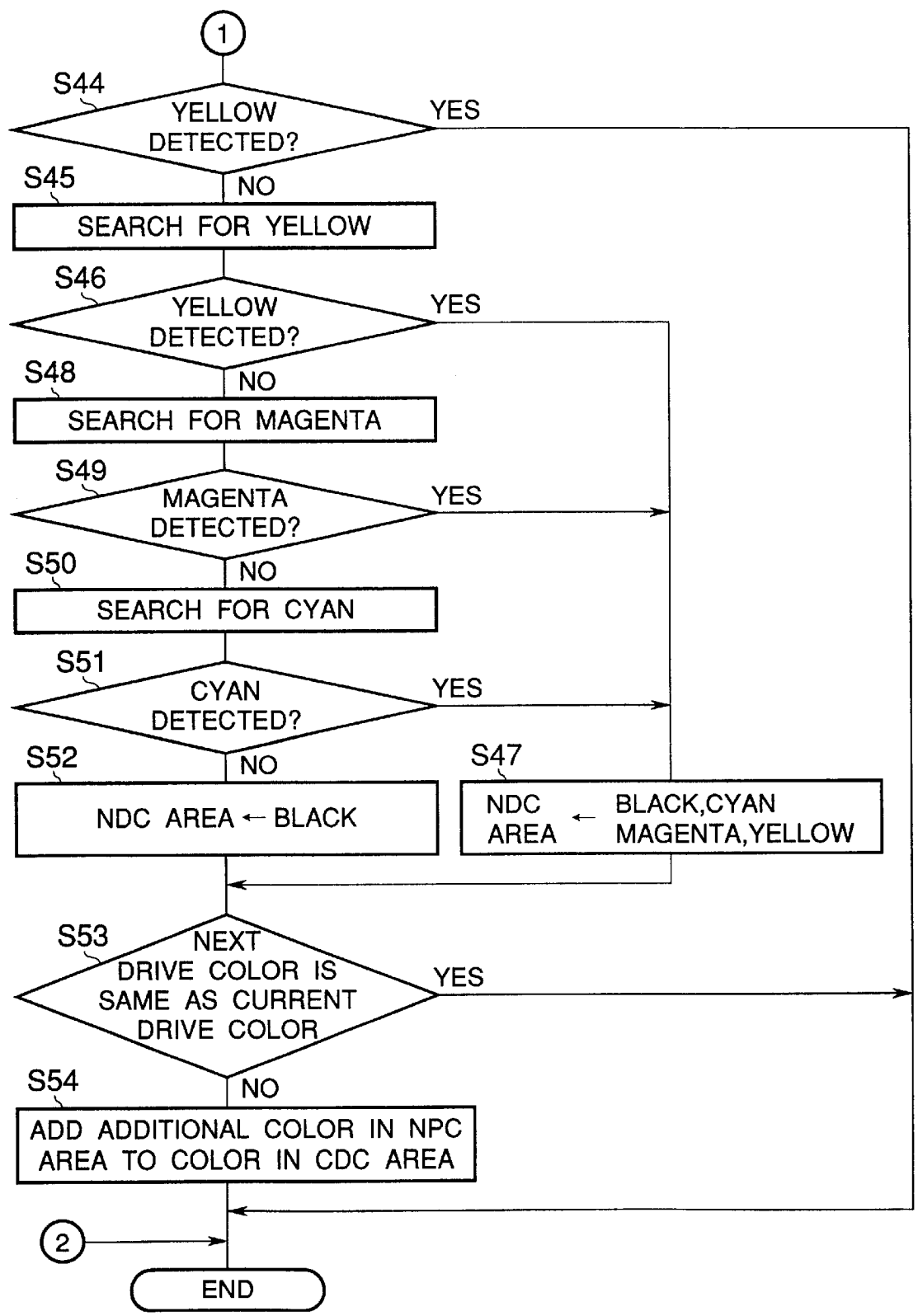

FIGS. 10 and 11 are flowcharts illustrating the procedure for determining a drive-color of a color printer according to the second embodiment.

It is assumed that the data converting section 3 has converted print data into bit map data before the program in FIGS. 10 and 11 is started.

The color plane detecting section 106 checks the job state flag in the job state memory 5a (step S41). If the job state flag has been reset ("NO" at step S41), then the color plane detecting section 106 resets (erases) the current drive-color (s) in the CDC area and the next drive-color(s) in the NDC area of the drive-color memory 6a (step S42). Thereafter, the program reports the drive-color selecting section 7a on the completion of the procedure. Then the program jumps to END and waits for the next print job.

A check is made at step S44 to determine whether "yellow" exists in the CDC area of the drive-color memory 6a. If the yellow exists in the CDC area, then it follows that all of "yellow," "magenta," "cyan," and "black" have been stored as the current drive-colors in the CDC area. Then, the program jumps to END.

If the answer is NO at step S44, then the bit map data is searched for "yellow" (step S45), and a check is made to determine whether "yellow" exists in the bit map data (step S46). If "yellow" exists in the bit map data, then all of "yellow," "magenta," "cyan," and "black" are stored as the next drive-colors into the NDC area (step S47).

If "yellow" does not exist in the bit map data at step S46, then the bit map data is searched for "magenta" (step S48). If "magenta" exists in the bit map data (YES a step S49), then the program proceeds to step S47 where all of "yellow," "magenta," "cyan," and "black" are stored as the next drive-colors in the NDC area.

If the answer is NO at step S49, then the bit map data is searched for "cyan" (step S50). Then, a check is made to determine whether "cyan" exists in the bit map data (step S51). If "cyan" exists, then all of "yellow," "magenta," "cyan," and "black" are stored as the next drive-colors in the NDC area (step S47).

If "cyan" does not exist at step S51, then it is assumed that there exists only "black." Then, "black" is set as the next drive-color (step S52).

Then, the next drive-colors in the NDC area are compared with the current drive-colors in the CDC area (step S53). If the NDC area contains a color which is not found in the CDC area (S53), then that color in the NDC area is added to the current drive-color(s) in the CDC area (step S54), so that the drive-color selecting section 7a causes a positioning mechanism 60 corresponding to this additional current drive-color to be brought to the operative position (step S54). Then, the program proceeds to END. If the answer is YES at step S53, then the program jumps to END.

After having carried out the flowchart of FIGS. 10 and 11 for each page, the color selecting section 7a brings positioning mechanisms 60 corresponding to the current drive-colors in the CDC area and the print section 4 starts printing.

<Advantages of the Second Embodiment>

If the color plane detecting section 106 has detected any one of yellow, magenta, and cyan which is not found in the CDC area, the positioning mechanisms of all the image forming sections 11–14 are brought to their operative positions. If the color plane detecting section 106 has detected only black in the first page of a print job, then only the positioning mechanism 60 of the black image forming section is brought to the operative position.

In other words, the positioning operation of the image forming sections 11–14 includes two kinds; the first is a positioning operation when printing a black-and-white image and the second is a positioning operation when printing a color image. If the first page of a print job has print data for a black-and-white image, then only when the print data changes from a page of black-and-white image to a page of color image, the yellow, magenta, and cyan image forming sections 11–13 are brought to their operative positions, thereby reducing the number of times the positioning mechanisms are brought to the operative positions during a job. This makes the print throughput less sensitive to the influence of switching the positioning mechanisms between their operative positions and the non-operative positions.

Third Embodiment

<Construction>

FIG. 12 is a block diagram illustrating a general construction of a color printer according to a third embodiment of the invention.

The third embodiment differs from the first embodiment in that the job detecting section 5 is not used and a print controlling section 117 is used in place of the print controlling section 7. Elements similar to those in FIG. 1 have been given like reference numerals and the description thereof is omitted.

The color plane detecting section 116 includes a drive-color memory 6a which has a CDC (Current Drive-Color) area and a NDC (Next Drive-Color) area. The current drive-colors are stored in the CDC area and the next drive-colors are stored in the NDC area. The data converting section 3 converts print data into bit map data. The color plane detecting section 116 searches the bit map data for a color which is not found in the CDC area.

If a color is detected by the color detecting section 116 but not found in the CDC area, the color plane detecting section 116 stores the detected color as a next print color into the NDC area. The color plane detecting section 116 also updates the current drive-color(s) in the CDC area by adding the next drive-color in the NDC area to the current drive-color(s) in the CDC area.

The color plane detecting section 116 monitors a print state flag of a later described operation monitoring section 7b of the print controlling section 117. When the print state flag is reset, then the color plane detecting section 116 resets the current drive-color(s) in the CDC area and the next drive-color(s) in the NDC area.

The print controlling section 117 differs from the print controlling section 7 of FIG. 1 in that an operation monitoring section 7b is added.

The operation monitoring section 7b monitors the printing section 4 to determine whether the printing section 4 is in an operative state or in an idle state. In the operative state, the printing section 4 receives the bit map data from the data converter 3 and prints the bit map data, and the endless belt 20 is running normally. In the idle state, the printing section 4 is waiting for bit map data from the data converter 3 and the endless belt 20 is not running. The operation monitoring section 7b sets the print state flag when the printing section 4 changes from the idle state to the operative state (i.e., when printing section 4 has received the bit map data from the data converting section 3), and resets the print state flag a predetermined time after the printing section 4 has printed one page.

The operative state and idle state of the printing section 4 will be described.

Upon power on of the color image printer, the print controlling section 117 initializes the printing section 4 so that the printing section 4 enters the idle state.

Then, print data is input to the input section 1, and the print data is edited by an editing section 2 on a page-by-page basis. The data converting section 3 converts the print data into bit map data. When the bit map data is output to the printing section 4, the image forming sections 11–14, endless belt 20, and paper feeding section 30 are driven into their operative states. Upon completion of printing, the image forming sections 11–14, endless belt 20, paper feeding section 30 are driven back into their idle states.

When a plurality of successive pages are to be printed, the editing section 2 and the data converting section 3 need longer time in performing editing operation and data converting operation, respectively, so that the printing operation of the next page cannot be started immediately after the printing section 4 has completed the printing operation of one page. In such a case, the image forming sections 11–14, endless belt 20, and paper feeding section 30 enter their idle states. When, the bit map data for the next page is output to the printing section 4, the image forming sections 11–14, endless belt 20, and paper feeding section 30 are again driven into their operative states.

In other words, in the first embodiment, the drive-colors stored in the drive-color memory 6a are reset (erased) according to the content of the job state flag, and the positioning mechanisms 60 of all the image forming sections 11–14 are returned to their non-operative positions. In contrast, in the third embodiment, the print state flag indicates whether the printing section 4 is in the operative state or in the idle state. If the print state flag is reset, the drive-colors in the CDC area are reset and the positioning mechanisms of all the image forming sections are returned to their non-operative positions.

<Operation>

Upon power up, the various sections of the color image printer are initialized. The current drive-colors in the CDC area and the next drive-colors in the NDC area are reset, so that there are no drive-colors stored in the drive-color memory 6a. The print color selecting section 7a causes the positioning mechanisms of all the image forming sections 11–14 in the printing section 4 to be brought to their non-operative positions, and resets the print state flag.

Then, print data is input to the input section 1, and edited by an editing section 2 on a page-by-page basis. Subsequently, the data converting section 3 converts the print data into bit map data.

Figure 13B:
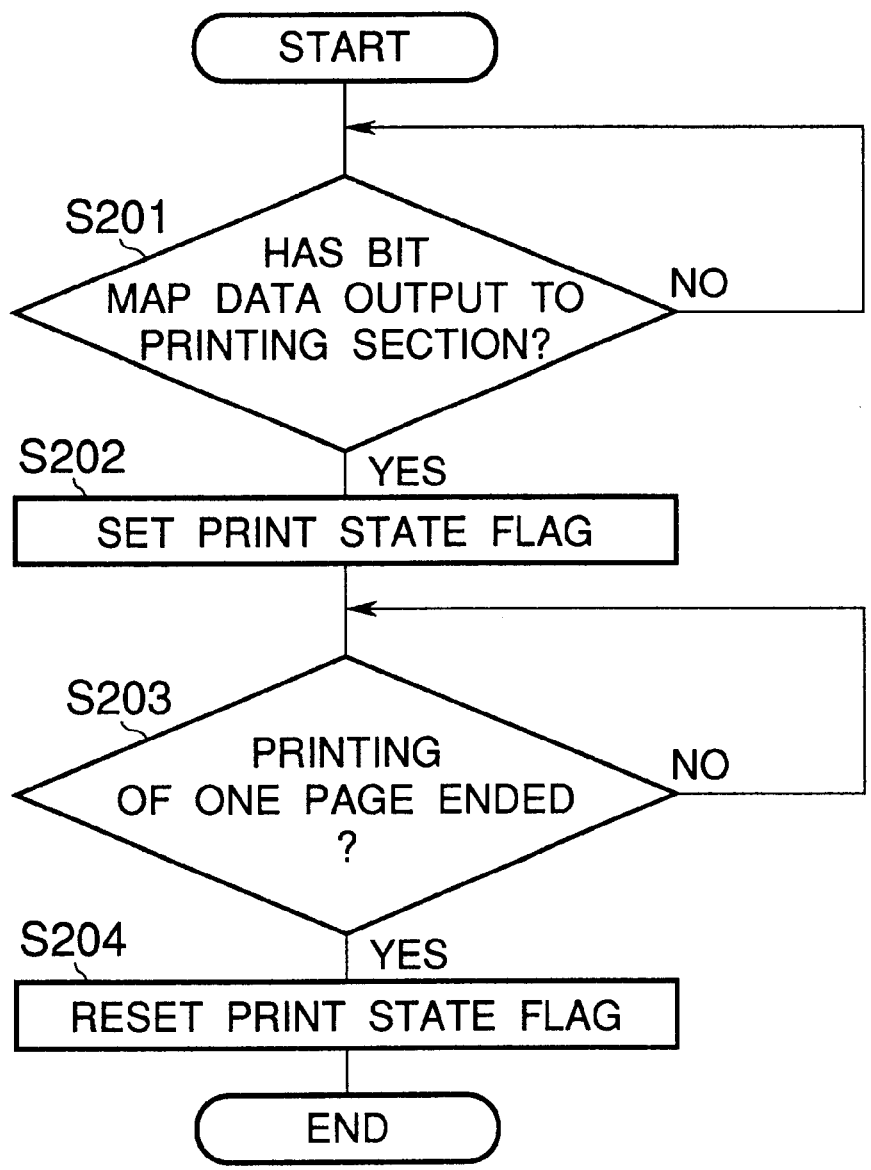
FIG. 13B illustrates the operation of the operation monitoring section 7b.

FIG. 13B illustrates the operation of the operation monitoring section 7b.

When data converter 3 outputs at step S201 the bit map data to the printing section 4, the image forming sections 11–14, endless belt 20, paper feeding section 30 are driven into their operative states and the operation monitoring section 7b sets the print state flag (step S202). When the printing of the current page has been completed (step S203), the operation monitoring section 7b resets the print state flag (step S204).

If bit map data for the next page is not output from the data converting section 3, various parts of the printing section 4 come to stop.

FIG. 13A is a flowchart illustrating the operation of determining the drive-color in the bit map data, performed by the color image printer according to the third embodiment. It is assumed that the data converting section 3 has converted print data into bit map data for the next page. FIG. 13A is also entered when the flowchart of FIG. 13B has been completed.

A check is made at step S59 to determine whether the print state flag has been set. If the answer is YES, then the program proceeds to step S64 and if the answer is NO at step S59, then program waits a predetermined length of time at step S60.

Then, the color plane detecting section 116 checks the print state flag (step S61) to determine whether the print state flag has been set. If the answer is NO at step S61, then the program proceeds to step S62 where the color plane detecting section 116 resets the current drive-color(s) in the CDC area and the next drive-color(s) in the NDC area of the drive-color memory 6a. After step S62, the program proceeds to step S70 where the program reports the print color selecting section 7a of the completion of processing for one page. If the answer is YES at step S61, then the program proceeds to step S64.

The steps S64–S69 are the same as steps S14–S20 of FIG. 7 and reference is made to FIG. 7 and the corresponding description for detail.

After having carried out the flowchart of FIG. 13 for each page, the color selecting section 7a brings positioning mechanisms 60 corresponding to the current drive-colors in the CDC area and the print section 4 starts printing.

<Advantages the Third Embodiment>

If print data having no job instruction is to be printed, the positioning mechanisms of the image forming sections 11–14 can be brought to the non-operative positions appropriately by monitoring the print state flag. Therefore, the usable lives of the photoconductive drums and endless belt 20 can be prolonged and the toner can be prevented from deteriorating due to mechanical stress.

Fourth Embodiment

<Construction>

Figure 14:
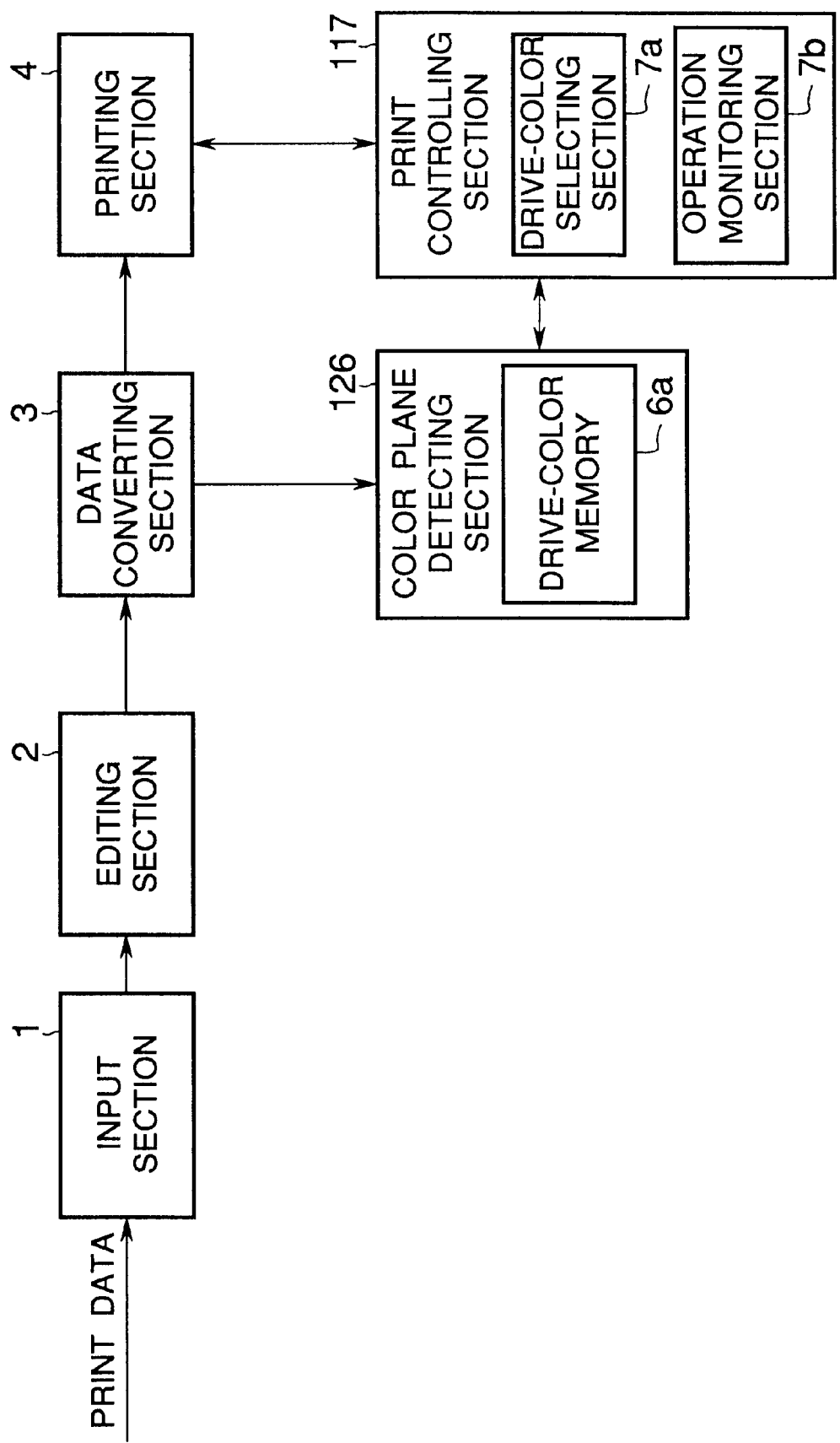
FIG. 14 is a block diagram, showing a general construction of the color image printer according to a fourth embodiment.

FIG. 14 is a block diagram, showing a general construction of the color image printer according to a fourth embodiment.

The construction of the fourth embodiment differs from that of the second embodiment in that a color plane detecting section 126 is used in place of the color-plane detecting section 106, a job detecting section is not used, and a print controlling section 117 has an operation monitoring section 7b. Elements similar to those in the second embodiment have been given the same reference numerals and the descriptions thereof are omitted.

The color-plane detecting section 126 includes a drive-color memory 6a has a CDC (Current Drive-Color) area and a NDC (Next Drive-Color) area. The current drive-colors are stored in the CDC area and the next drive-colors are stored in the NDC area. The data converting section 3 converts print data into bit map data. The color plane detecting section 126 checks bit map data on a page-by-page basis in order to detect a color(s) which is not found in the CDC area.

If any one of "yellow," "magenta," and "cyan" is detected in the bit map data but is not found in the CDC area, then the color plane detecting section 126 stores all of "yellow," "magenta," "cyan," and "black" as a next-print color into the NDC area. Then, the colors in the NDC area are added to the current drive-colors in the CDC area. If none of "yellow," "magenta," and "cyan" is found as a next drive-color in the bit map data for the first page, then the color plane detecting section 126 stores only black as a next-print color into the NDC area and the content of the NDC area is then moved-into the CDC area.

The operation monitoring section 7b monitors the printing section 4 to determine whether the printing section 4 is in an operative state or in an idle state.

In the operative state, the printing section 4 receives the bit map data from the data converter 3 and prints the bit map data, and the endless belt 20 is running normally. In the idle state, the printing section 4 is waiting for bit map data from the data converter 3 and the endless belt 20 is not running. The color plane detecting section 126 monitors the print state flag of the operation monitoring section 7b. The operation monitoring section 7b monitors the operation of the printing section 4. If the bit map data is not received by the printing section 4 a predetermined length of time after the bit map data of the last page, then the monitoring section 7b resets the print state flag. If the operation monitoring section 7b has reset the print state flag, the color plane detecting section 126 resets (erases) the current drive-colors in the CDC area and the next drive-colors in the NDC area.

In other words, in the second embodiment, a job state flag is monitored and positioning mechanisms 60 of image forming sections are switched between the operative position and non-operative position according to the job state flag. In the fourth embodiment, the print state flag is monitored and positioning mechanisms 60 of image forming sections are switched between the operative position and non-operative position according to the print state flag.

<Operation>

FIG. 13B illustrates the operation of the operation monitoring section 7b. Reference is made to the third embodiment for detailed description of FIG. 13B.

Figure 15:
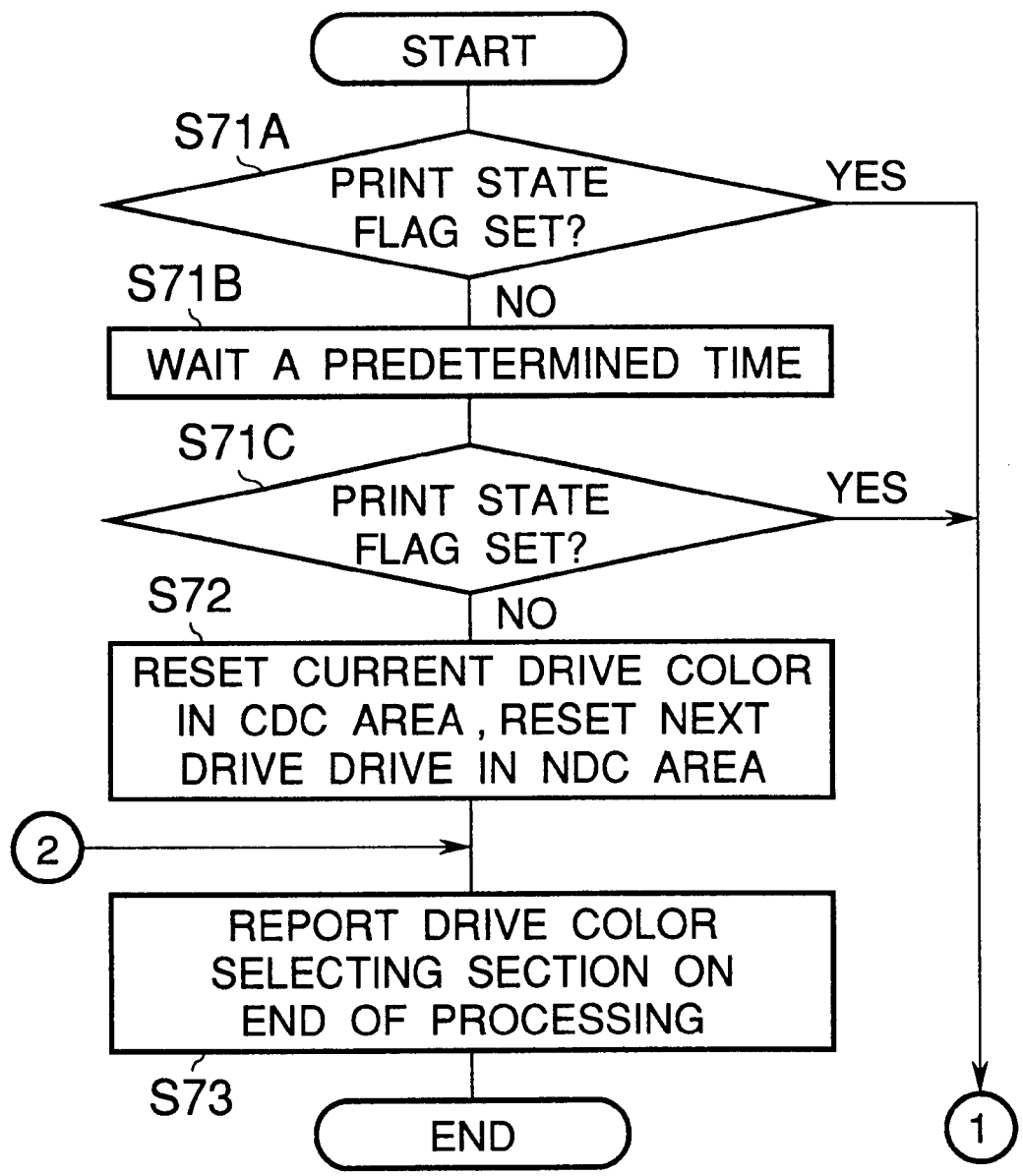
FIG. 15 and FIG. 16 are flowcharts illustrating the procedure for determining drive-color, performed by the color image printer according to the fourth embodiment.
Figure 16:
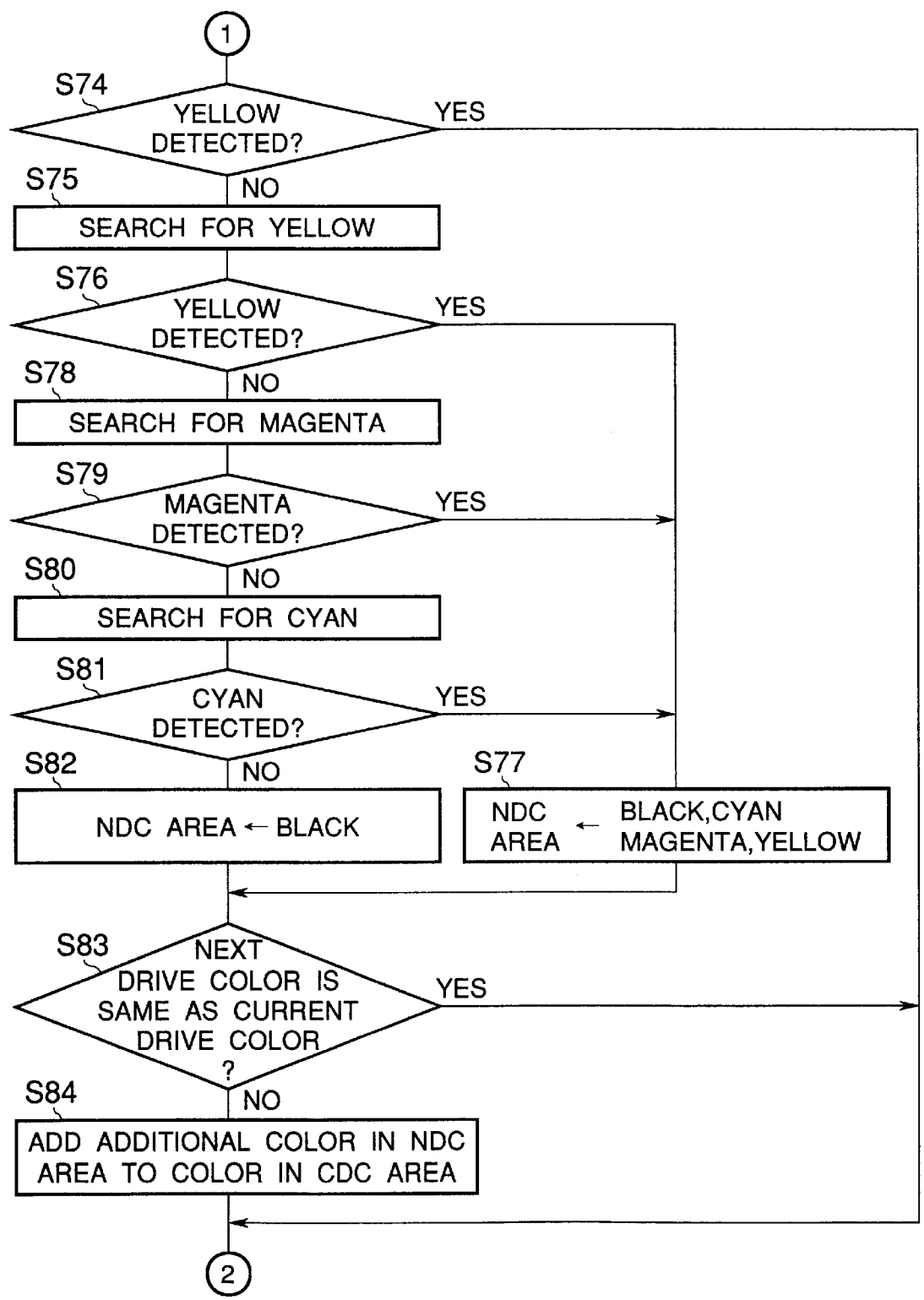

FIG. 15 and FIG. 16 are flowcharts illustrating the procedure for determining drive-color, performed by the color image printer according to the fourth embodiment. It is assumed that the data converting section 3 has converted bit map data for one page. The flowchart of FIGS. 15 is also entered when the flowchart of FIG. 13B has been completed.

The color plane detecting section 126 checks the print state flag to determine whether the print state flag has been set (step S71A). If the answer is YES at step S71A, then the program jumps to step S74. If the answer is NO at step S71A, then the program waits a predetermined length of time at step S71B and proceeds to step S71C where a check is made to determine whether the print state flag has been set. If the answer is YES, the program jumps to step S74. If the answer is No at step S71C, then the program proceeds to step S72 where the color plane detecting section 126 resets the current drive-color(s) in the CDC area and the next drive-color(s) in the NDC area of the drive-color memory 6a (step S72). As a result, the drive-color selecting section 7a causes the positioning mechanisms of all the image forming sections 11–14 to be brought to the non-operative positions (step S73).

Subsequent steps S74–S84 are the same as steps S44–S54 of FIG. 11 of the second embodiment and the description thereof is omitted.

After having carried out the flowchart of FIGS. 15 and 16 for each page, the color selecting section 7a brings positioning mechanisms 60 corresponding to the current drive-colors in the CDC area and the print section 4 starts printing.

<Advantages of the Fourth Embodiment>

The positioning mechanisms are switched between their operative positions and non-operative positions according to two kinds of operations, i.e., printing operation of black-and-white images and printing operation of color images. If the first page of a print job is a black-and-white image, then the yellow, magenta, and cyan image forming sections 11–13 are brought to the operative positions only when the bit map data changes from a black-and-white image page to a color image page, thereby reducing the number of times the image forming sections are brought to the operative positions. This way of operation minimizes the adverse effect of the frequent switching of the positioning mechanisms to the printing throughput of the printer.

When the printing section 4 is switched from the operative state to the idle state, the operation monitoring section 7b resets the print state flag and the color plane detecting section 116 resets the current drive-color(s) in the CDC area and the next drive-color(s) in the NDC area of the drive-color memory 6a.

Therefore, even if print data having no job instruction is to be printed, the positioning mechanisms 60 of the image forming sections 11–14 can still be brought to the non-operative positions properly after printing. Therefore, the lives of the photoconductive drums and endless belt 20 can be prolonged and the toner can be prevented from deteriorating due to mechanical stress.

Fifth Embodiment
<Construction>

Figure 17:
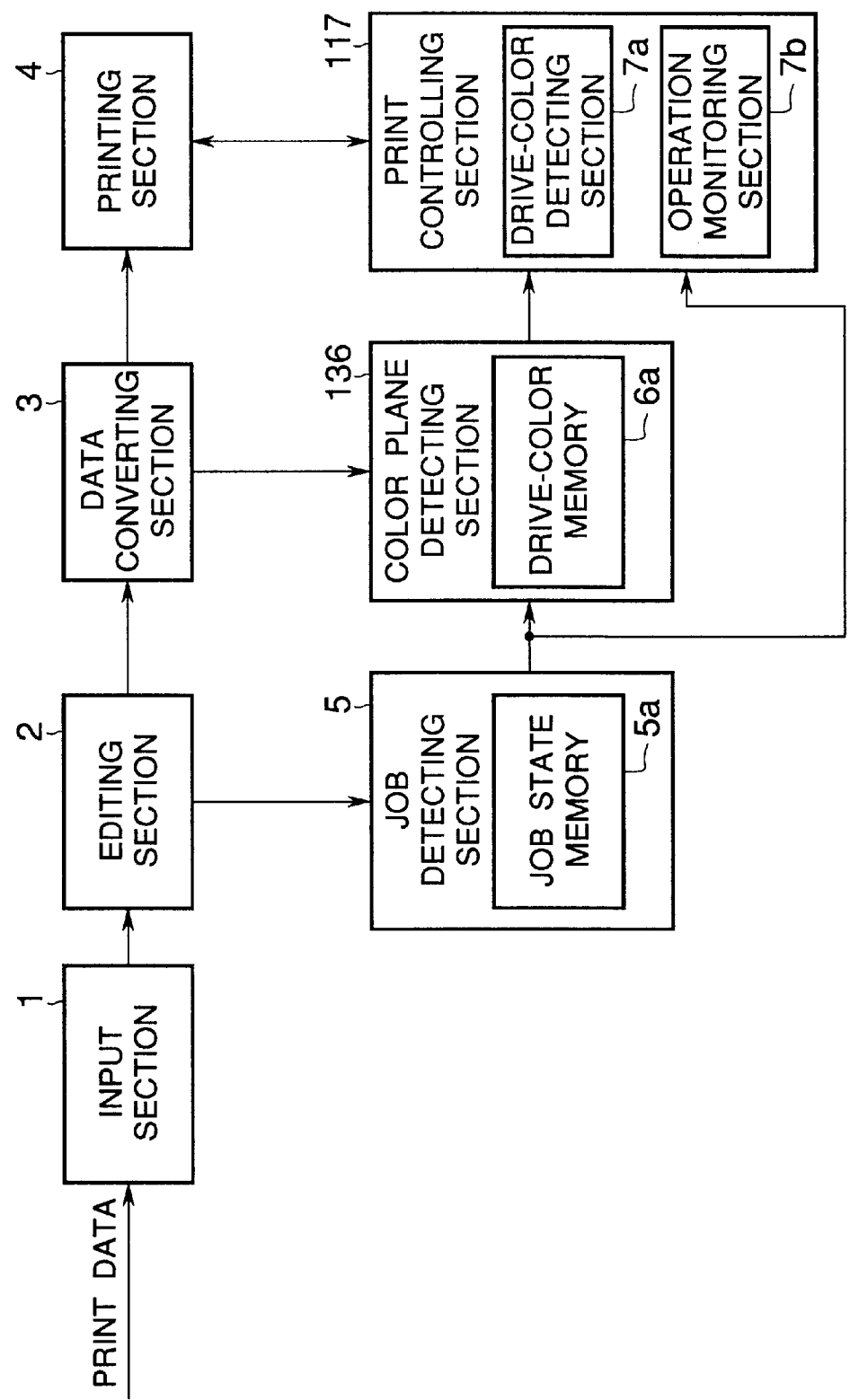
FIG. 17 s a block diagram, illustrating a color image printer according to a fifth embodiment of the invention.

FIG. 17 s a block diagram, illustrating a color image printer according to a fifth embodiment of the invention.

The printer has an input section 1, editing section 2, data converting section 3, printing section 4, color plane detecting section 136, and print controlling section 117.

Elements similar to those of the first embodiment shown in FIG. 1 have been given the same reference numerals and the description thereof is omitted.

The color plane detecting section 136 includes a drive-color memory 6a having a CDC (Current Drive-Color) area and a NDC (Next Drive-Color) area. The current drive-color (s) is stored in the CDC area and the next drive-color(s) is stored in the NDC area. The data converting section 3 converts print data into bit map data. The color plane detecting section 136 checks bit map data to detect colors of bit map data of each page of a job. If a detected color is not found in the CDC area of the drive-color memory 6a, then the color plane detecting section 136 stores the detected color as a next drive-color into the NDC area of the drive-color memory 6a. Then, the content of the NDC area is added to the current drive-colors in the CDC area after the current page has been printed, thereby updating the current drive-colors.

The color plane detecting section 136 monitors the job state flag in the job state memory 5a. The operation monitoring section 7b monitors the operation of the printing section 4. If the bit map data is not received by the printing section 4 a predetermined length of time after the bit map data of the last page, then the monitoring section 7b resets the print state flag. When the job detecting section 5 resets the job state flag in the job state memory 5a, the color plane detecting section 136 resets the current drive-color(s) in the CDC area and the next drive-color(s) in the NDC area. The color plane detecting section 136 also monitors the print state flag. If the print state flag remains reset longer than a predetermined length of time, then the color plane detecting section 136 resets the current drive-color(s) in the CDC area and the next drive-color(s) in the NDC area.

In other words, in the fifth embodiment, when the job detecting section 5 detects a job ending instruction contained in the print data so that the job state flag is reset, the positioning mechanism of all the image forming sections 11–14 are brought to their non-operative positions. Also, when the printing section 4 enters the idle state so that the operation monitoring section 7b resets the print state flag, the positioning mechanism of all the image forming sections 11–14 are brought to their non-operative positions.
<Operation>

Upon power on, the contents in the CDC area and the NDC area reset and the print controlling section causes the positioning mechanism 60 to bring all of the image forming sections to the non-operative positions.

FIG. 13B illustrates the operation of the operation monitoring section 7b. Reference is made to the third embodiment for detailed description of FIG. 13B.

Figure 18:
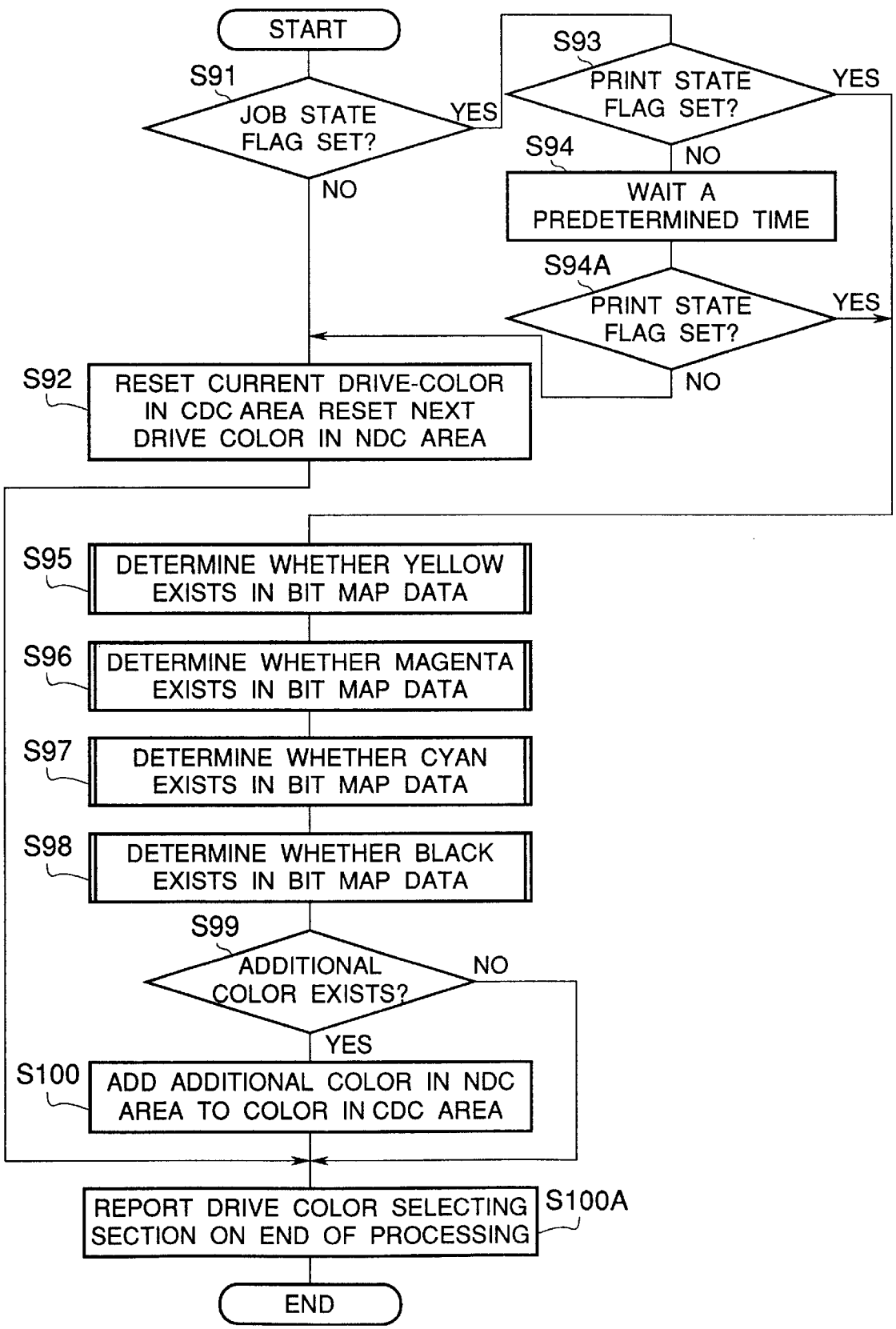
FIG. 18 is a flowchart, illustrating the procedure for determining the drive-color of the color image printer according to the fifth embodiment.

FIG. 18 is a flowchart, illustrating the procedure for determining the drive-color of the color image printer according to the fifth embodiment. It is assumed that bit map data for one page has been converted by the data converting section 3. The flowchart of FIG. 18 is also entered when the flowchart of FIG. 13B has been completed.

The color plane detecting section 136 checks the job state flag in the job state memory 5a to determine whether the job state flag has been set (step S91); if the answer is NO, the color plane detecting section 136 resets the current drive-color(s) in the CDC area and the next drive-color(s) in the NDC area of the drive-color memory 6a (step S92).

If the answer is YES at step S91, the program proceeds to step S93 where a check is made to determine whether the data converting 3 has output bit map data for the next page to the printing section 4, i.e. whether the print state flag has been set. If the answer is YES at step S93, then the program jumps to step S95 and if NO, the program waits a predetermined length of time at step S94. Then, a check is made a step S94A to determine whether the print state flag has been set. If the answer is YES at step S94A, then the program proceeds to step S95. If the answer is NO at step S94A, the program proceeds to step S92.

Steps S95–S100 and 100A are the same as steps S14–S20 of FIG. 7 and the description thereof is omitted.

After having carried out the flowchart of FIG. 18 for each page, the color selecting section 7a brings positioning mechanisms 60 corresponding to the current drive-colors in the CDC area and the print section 4 starts printing.
<Advantages of the Fifth Embodiment>

When the job detecting section 5 has detected a job ending instruction and the print controlling section 7 has determined that the printing section 4 is in the idle state, the positioning mechanisms 60 of all of the image forming sections 11–14 are brought to their non-operative positions. This way of operation provides prolonged lives of the photoconductive drums 51 and endless belt 20 and decreases the chances of the toner deteriorating due to mechanical stress.

Sixth Embodiment

A sixth embodiment is directed to a printer which prints two kinds of data: the first is print data with a job instruction (i.e., job-beginning instruction and job-ending instruction), and the second is print data without a job instruction.
<Construction>

The sixth embodiment differs from the fifth embodiment in that a color plane detecting section 146 is used in place of the color plane detecting section 136. Elements similar to those in FIG. 17 have been given the same reference numerals and the description thereof is omitted.

Figure 19:
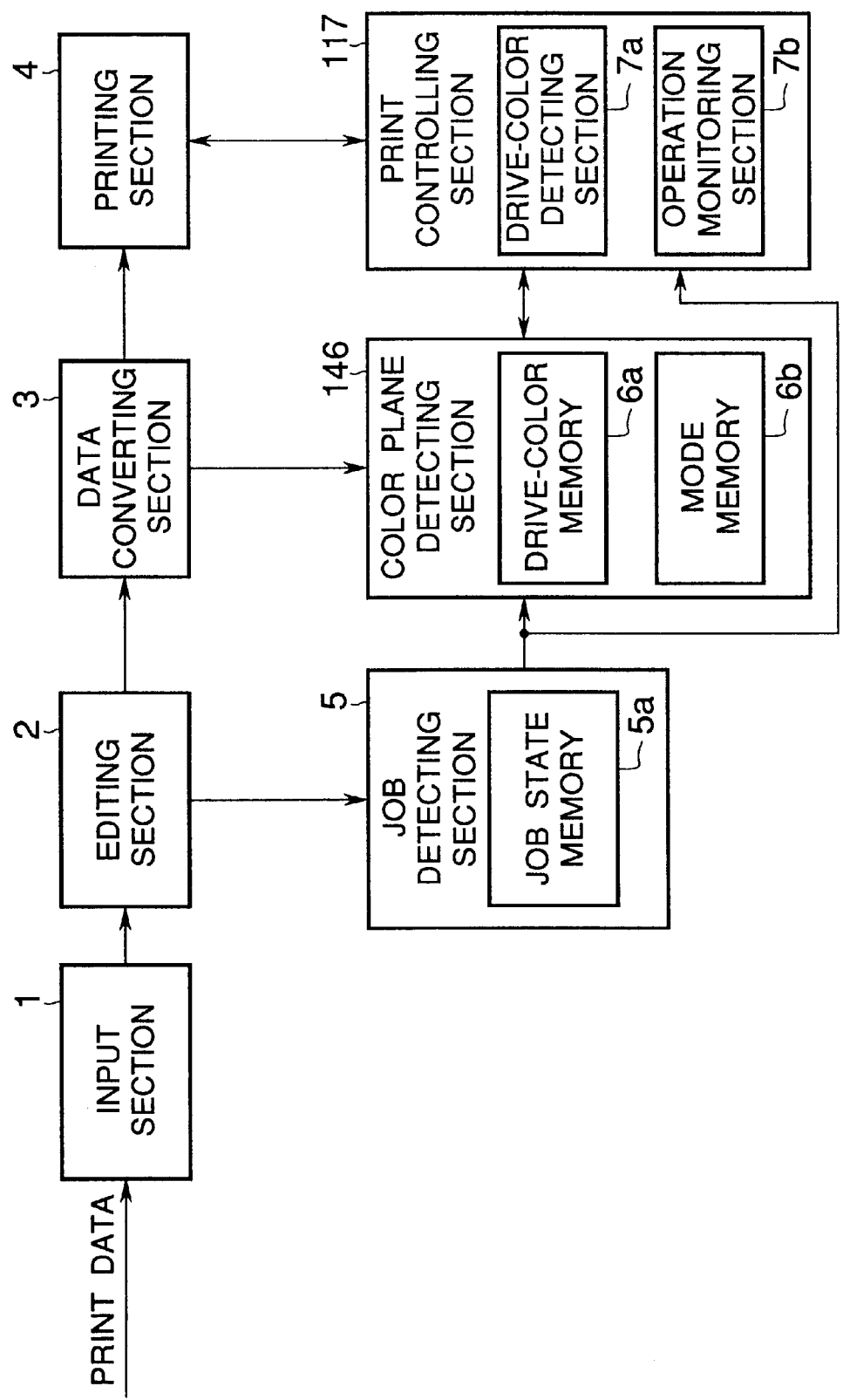
FIG. 19 is a block diagram illustrating a general construction of a color image printer according to the sixth embodiment.

FIG. 19 is a block diagram illustrating a general construction of a color image printer according to the sixth embodiment.

Referring to FIG. 19, the color plane detecting section 146 includes a drive-color memory 6a having a CDC (Current Drive-Color) area and a NDC (Next Drive-Color) area. The current drive-colors are stored in the CDC area and the next drive-colors are stored in the NDC area. Upon power on, the contents in the CDC area and the NDC area are reset and the print controlling section 117 causes the positioning mechanism 60 to bring all of the image forming sections 11–14 to the non-operative positions. The data converting section 3 converts the print data into bit map data. The color plane detecting section 146 detects colors of bit map data of each page of the job. If a color detected by the plane detecting section 146 is not found in the CDC area, then the detected color is added to the current drive-color in the CDC area, thereby updating the current drive-colors.

The job detecting section 5 detects job instructions (e.g., job-beginning instruction and job-ending instruction) contained in the print data directed to the editing section 2, and sets a job state flag in a job state memory section 5a when the job detecting section 5 has detected the job beginning instruction and resets the job state flag when the job detecting section 5 has detected the job ending instruction.

The color plane detecting section 146 also has a mode memory 6b in which a mode flag is stored. The mode flag is set or reset to reflect the job state flag. As will be described later, the mode flag plays an important role when print data without a job instruction is to be printed after the printing operation a job with of a job instruction has been has been completed.

Thus, a job state during printing operation is indicated by the job state flag in the job state memory 5*a* if the print data has a job instruction, or by the mode flag in the mode memory 6*b* if the print data has not a job instruction.

The printer operates as follows when the print data has a job instruction.

Upon detecting a job-beginning instruction, the job detecting section 5 sets the job state flag, thereby indicating that a job has been begun. Upon a job-ending instruction, the job detection section 5 resets a job state flag, thereby indicating that the job has been completed.

The current drive-color(s) in the CDC (Current Drive-Color) area and the next drive-color(s) in the NDC (Next Drive-Color) area of the drive-color memory 6*a* are reset upon detection of a job ending instruction, and thereafter the positioning mechanisms of all the image forming sections are brought to the non-operative positions.

The printer operates as follows when the print data does riot have a job instruction.

The current drive-color and the next drive-color in the drive-color memory 6*a* are reset upon detection of an idle state of the printing section 4, and thereafter the positioning mechanisms of all the image forming sections are brought to the non-operative positions.

The operation monitoring section 7*b* monitors the operation of the printing section 4. If the bit map data is not received by the printing section 4 a predetermined length of time after the bit map data of the last page, then the monitoring section 7*b* resets the print state flag.

<Operation>

Upon power on, the contents in the CDC area and the NDC area reset and the print controlling section causes the positioning mechanism 60 to bring all of the image forming sections to the non-operative positions.

FIG. 13B illustrates the operation of the operation monitoring section 7*b*. Reference is made to the third embodiment for detailed description of FIG. 13B.

FIG. 20A is a flowchart illustrating the procedure for determining the drive-color, performed by a color image printer according to the sixth embodiment.

It is assumed that bit map data for one page has been converted by the data converting section 3. The flowchart of FIG. 20A is also entered when the flowchart of FIG. 13B has been completed.

The color plane detecting section 146 checks the job state flag in the job state memory 5*a* (step S101); if the answer is YES, then it follows that the print data has a job instruction. The program jumps to step S106. If the answer is NO at step S101, it follows that the print data has a job instruction and the printing operation thereof has completed, or that the print data has not a job instruction and the printing operation thereof has not completed. Thus, the program proceeds to step S102 where the color plane detecting section 146 checks the mode flag in the mode memory 6*a*.

If the answer is NO at step S102, then it follows that the print data does not contain a job instruction. Then, the program proceeds to step S103 where a check is made to determine whether the print state flag has been set. If the answer is YES at step S102, then it follows that the job has a job instruction and the job detecting section 5 has detected the job ending instruction of the job. The program proceeds to step S104.

If the answer is YES at step S103, then it follows that the printing section has received bit map data from the data converting section 3. The program proceeds to step S106.

If the answer is NO at step S103, then it follows that the printing operation has completed or the printing section 4 has not received the bit map data. The program waits a predetermined length of time at step S105 and then a check is made at step S105A to determine whether the print state flag has been set. If the answer is NO, then the program proceeds to step S104 where the color plane detecting section 146 resets the current drive-colors in the CDC area and the next drive-colors in the NDC area. Then the program jumps to step S110A where the drive-color selecting section 7*a* causes the positioning mechanism of all the image forming sections to be brought to the non-operative position.

Steps S106–S110 are the same as steps S95–S100 of FIG. 18 and the description thereof is omitted.

After having carried out the flowchart of FIG. 20A for each page, the color selecting section 7*a* brings positioning mechanisms 60 corresponding to the current drive-colors in the CDC area and the print section 4 starts printing.

<Printing a Job Having No Job Instructions After a Job Having Job Instructions>

FIG. 20B is a timing chart illustrating the relation among relevant signals.

Referring to FIG. 20B, the mode flag is set and reset to reflect the state of the job state flag of the preceding job. When the job state flag is reset at the end of a job having a job instruction, the mode flag remains set. After the color detecting section 146 has detected colors in the first page of the bit map data of a new job ("Job 2" in FIG. 20B), the mode flag is set if the new job has a job instruction and reset if the new job has not a job instruction. Thus, the state of the mode flag at the beginning of a job serves to indicate whether the preceding job has a job instruction or not.

Thus, the answer at step S102 of FIG. 20A is YES if the flowchart is entered for the first page of the job. The answer at step S102 is NO for pages after the first pages. Once the printing section 4 enters the idle state, the flowchart of FIG. 20A ends. Thus, the remaining "Job 2" is treated as if it is another new job.

<Advantages of the Sixth Embodiment>

The drive-colors are reset on different conditions, depending on the presence and absence of a job instruction.

Seventh Embodiment

A print job may include a plurality of successive color-image pages and a plurality of successive black-and-white-image pages. For example, the first page is a color image and the following pages are a black-and-white image.

In a seventh embodiment, if the first page is a color image and the following pages are black-and-white images, then all of the image forming sections are brought to the operative positions for the first page. Then, only black image forming section is brought to the operative position for the second page onward. Then, a counter is counted up every time the following page has the same drive-colors as the preceding page. Therefore, if a predetermined number of consecutive pages are black-and-white images, then it can be assumed that the pages having black images will probably follow after the last black-and-white image pages. Thus, in the seventh embodiment, image forming sections which are likely to be used for printing a succeeding page are left at their operative positions.

<Construction>

Figure 21:
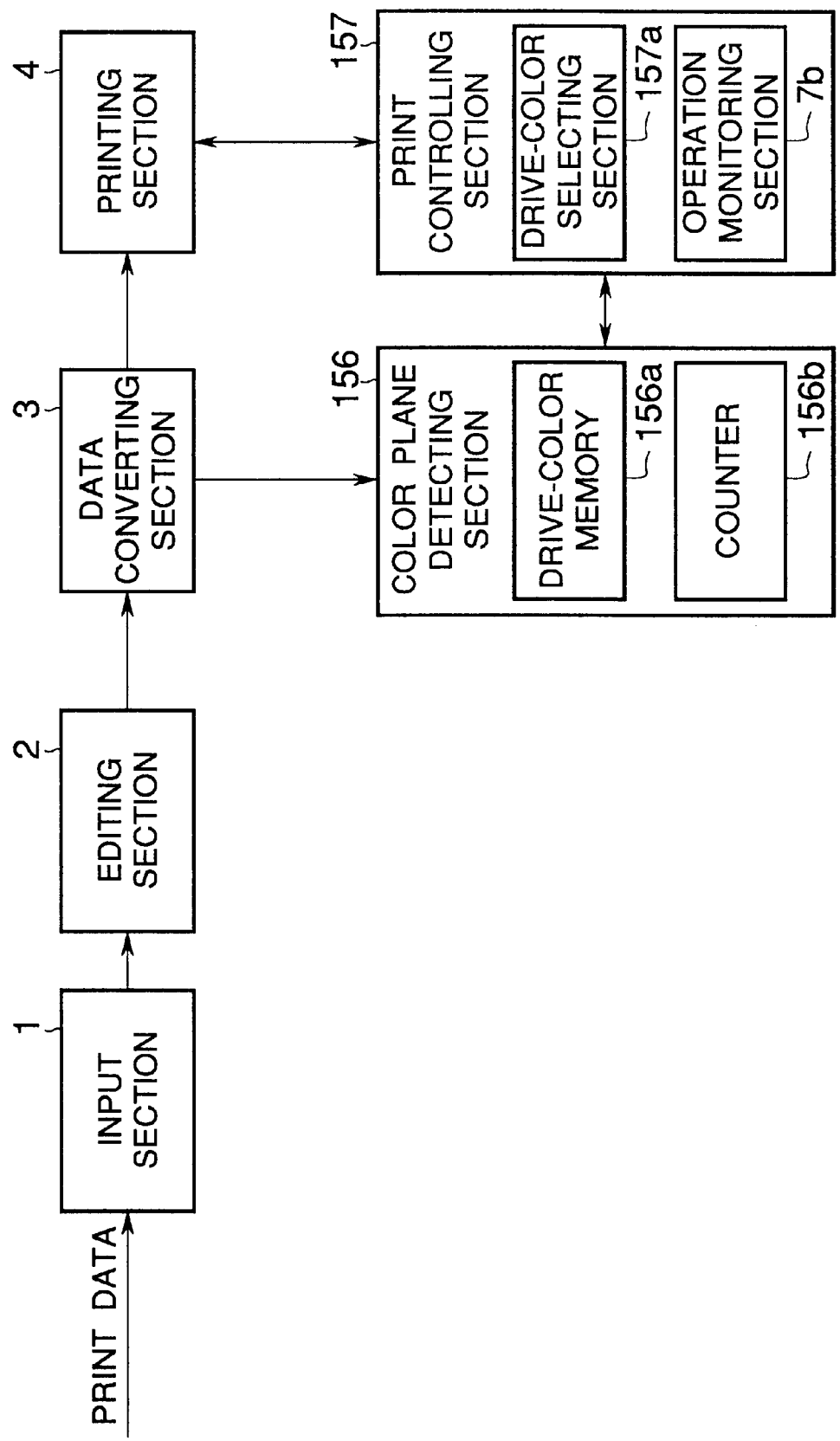
FIG. 21 is a block diagram illustrating a general construction of a color image printer according to a seventh embodiment.

FIG. 21 is a block diagram illustrating a general construction of a color image printer according to a seventh embodiment. The seventh embodiment differs from the third embodiment in that a color plane detecting section 156 and a print controlling section 157 are used in place of the color plane detecting section 116 and the print controlling section 117, respectively. The print controlling section 157 differs from the print controlling section 117 of FIG. 12 in that a drive-color selecting section 157a is used in place of the drive-color selecting section 7a.

Elements similar to those of FIG. 12 have been given the same reference numerals and the description thereof is omitted.

The color plane detecting section 156 includes a drive-color memory 156a and a counter 156b. The data converting section 3 converts the print data into bit map data. The color plane detecting section 156 searches bit map data for the respective colors on a page-by-page basis. The drive-color memory 156a includes a PPDC (Preceding Page Drive-Color) area, a FPDC (Following Page Drive-Color) area, and a CDC (Current Drive-Color) area. The PPDC area stores colors required for printing the preceding one of two successive pages. The FPDC area stores colors required for printing the following one of the two successive pages. The CDC area stores colors corresponding to image forming sections whose positioning mechanisms are at the operative position.

After having detected colors required for the following page, the color plane detecting section 156 compares the detected drive-colors in the FPDC area with the drive-colors in the PPDC area; if they are not coincident with each other, any color in the FPDC area which is not found in the PPDC area is added to the current drive-colors, thereby updating the current drive-colors in the PPDC area. Subsequently, the color plane detecting section 156 outputs a non-coincidence signal to a drive-color selecting section 157a.

The color plane detecting section 156 includes a counter 156b that counts the number of times (pages) the colors in the FPDC coincide with those in the PPDC area. When the counter 156 has counted up to a predetermined value, the current drive-colors in the CDC area are replaced by the current drive-colors in the FPDC area, and subsequently the color plane detecting section 156 outputs a switch signal to the drive-color selecting section 157a.

The color plane detecting section 156 monitors the print state flag. If the print state flag is not set, then the color plane detecting section 156 resets (erases) the current drive-colors in the CDC area, drive-colors in the PPDC area, and colors in the FPDC area.

The print controlling section 157 incorporates a drive-color selecting section 157a. When the color plane detecting section 156 outputs the non-coincidence signal or the switch signal, the drive-color selecting section 157a checks the current drive-colors stored in the CDC area of the drive-color memory 6a, then causes the positioning mechanisms 60 corresponding to the current drive-colors to be brought to the operative positions and those not corresponding to the current drive-colors to be brought to the non-operative positions.

<Operation>

Upon power on, the contents in the CDC area and the NDC area reset and the print controlling section 117 causes the positioning mechanism 60 to bring all of the image forming sections to the non-operative positions.

Figure 22:
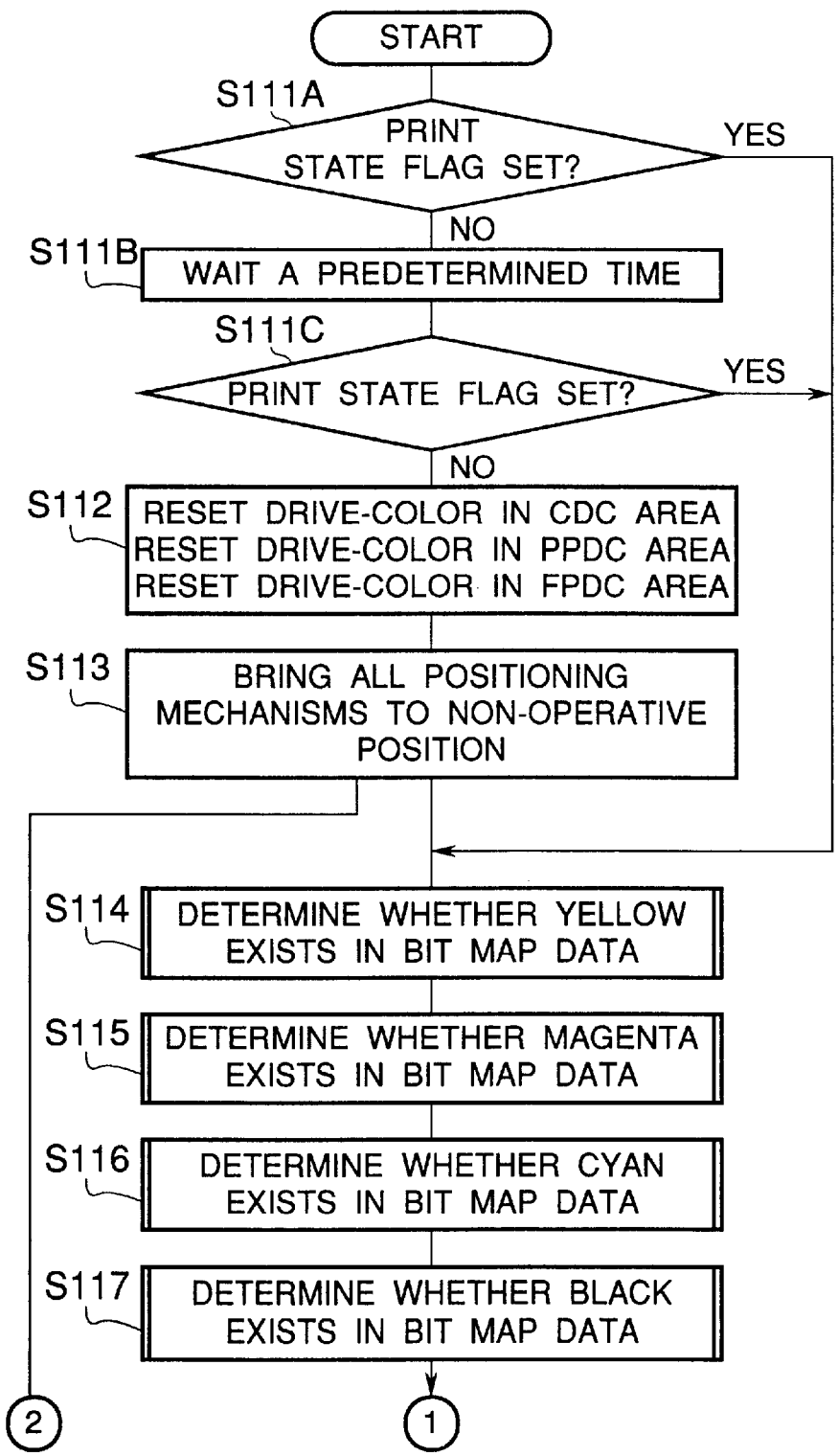
FIGS. 22 and 23 are flowcharts illustrating the procedure for determining the drive-colors for the color image printer according to the seventh embodiment.
Figure 23:
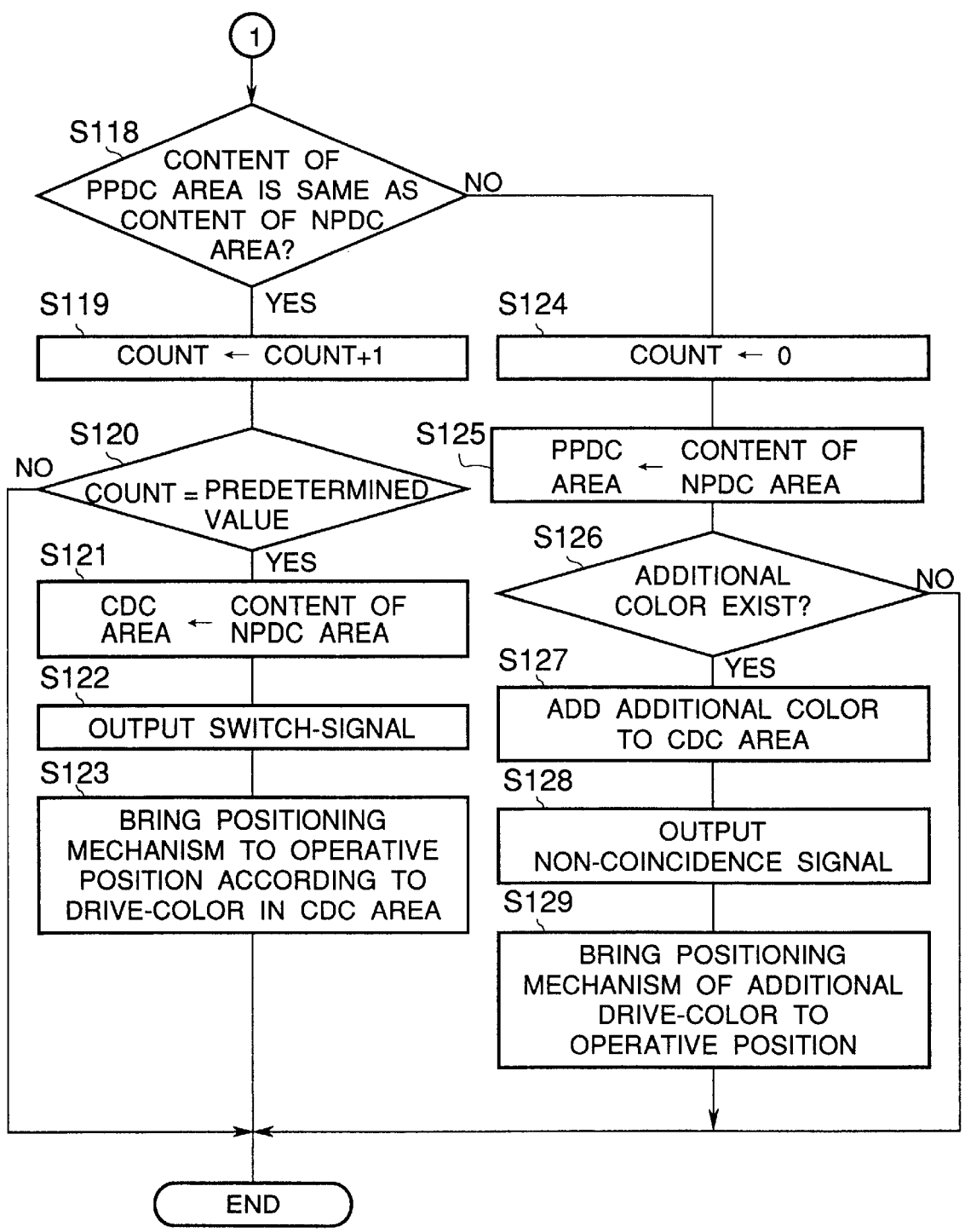

FIGS. 22 and 23 are flowcharts illustrating the procedure for determining the drive-colors for the color image printer according to the seventh embodiment. It is assumed that bit map data for one page has been converted by the data converting section 3 after having printed the preceding page.

At step S111A, the color plane detecting section 156 checks the print state flag of the operation monitoring section 7b to determine whether the print state flag has been set. If the answer at step S111A is YES, then the program jumps to step S114. If the answer is NO at step S111B, then the program waits a predetermined length of time a step S111B and then a check is made at step S111C whether the print state flag has been set. If the answer at step S111A is YES, then the program jumps to step S114. If the answer is NO at step S111C, the program proceeds to step 112 where the color plane detecting section 156 resets (erases) the current drive-colors in the CDC area, colors required for the preceding page in the PPDC area, and colors required for the following page in the FPDC area. As a result, the drive-color selecting section 7a causes the positioning mechanisms for all of the image forming sections to be brought to the non-operative positions (step S113).

At step S114, a check is made to determine whether the yellow exists in the bit map data. Likewise, at steps S115–117, similar checks are made for magenta, cyan, and black image forming sections 12–14.

Then, at step S118, the colors in the PPDC area are compared with the colors in the FPDC area determined by steps S114–117.

If the answer is YES at step S118, then the count of the counter 156b is incremented (step S119). Then, a check is made at step S120 to determine whether the count of the counter 156b equal to a predetermined value.

If the answer is YES at step S120, then the current drive-colors in the CDC area are replaced by the colors in the FPDC area (step S121) and the color plane detecting section 156 outputs the switch signal to the drive-color selecting section 157a (step S122).

Then, the drive-color selecting section 157a causes the positioning mechanisms for the image forming sections corresponding to the current drive-colors in the CDC area to be brought to the operative positions, and those not corresponding to the current drive-colors to be brought to the non-operative positions (step S123).

If the answer is NO at step S118, the program proceeds to S124 where the counter 156b is reset to zero. Then, the colors in the PPDC area are replaced by the color in the FPDC area (step S125) and the program proceeds to step S126 where a check is made to determine whether any color in the PPDC area is missing in the CDC area (step S126).

If the answer is YES at step S126, the color which is found in the FPDC but not in the CDC area is added into the CDC area, thereby updating the current-drive-colors in the CDC area (step S127), and the non-coincidence signal is output (step S128).

Then, the drive-color selecting section 157a causes the positioning mechanisms 60 for the image forming sections corresponding to the current drive-colors in the CDC area (step S129). Then, the program proceeds to END.

Figure 24:
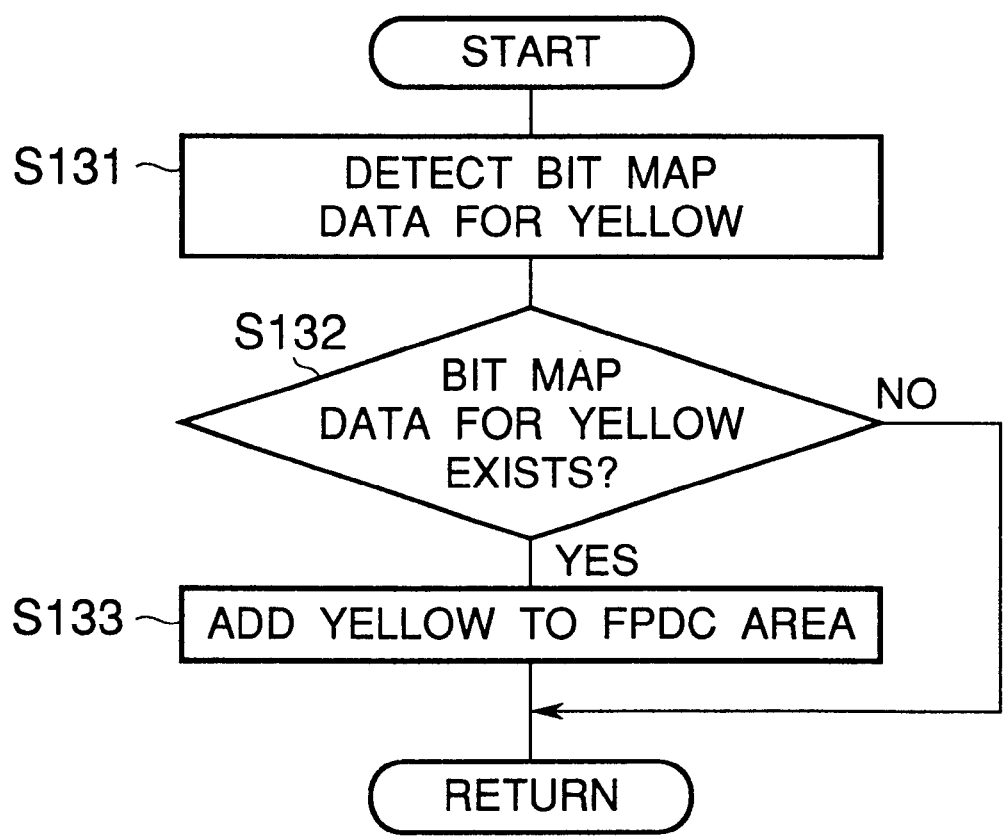
FIG. 24 is a flowchart illustrating, by way of example, the procedures for "yellow" performed at step S114.

FIG. 24 is a flowchart illustrating, by way of example, the procedures for "yellow" performed at step S114.

The bit map data is searched for "yellow" (step S131) and a check is made to determine whether "yellow" exists in the bit map data (step S132).

If the answer is YES at step S132, then "yellow" is added to the colors in the FPDC area (step S133). If the answer is NO at step S132, then the program jumps to RETURN. The procedure shown in FIG. 24 is repeated for "magenta," "cyan," and "black" at steps S115–117, respectively.

<Advantages>

The way of positioning the image forming sections according to the seventh embodiment prevents the mechanical wear of the image forming sections 11–14 and the endless belt 20 and suppresses the deterioration of toner due to mechanical stresses.

Eighth Embodiment

In an eighth embodiment, the bit map data is compressed and is compared with compressed reference data, thereby determining the presence and absence of the print data at high speed. This way of comparing bits greatly increases the speed in determining the presence and absence of print data of the respective colors.

<Construction>

Figure 25:
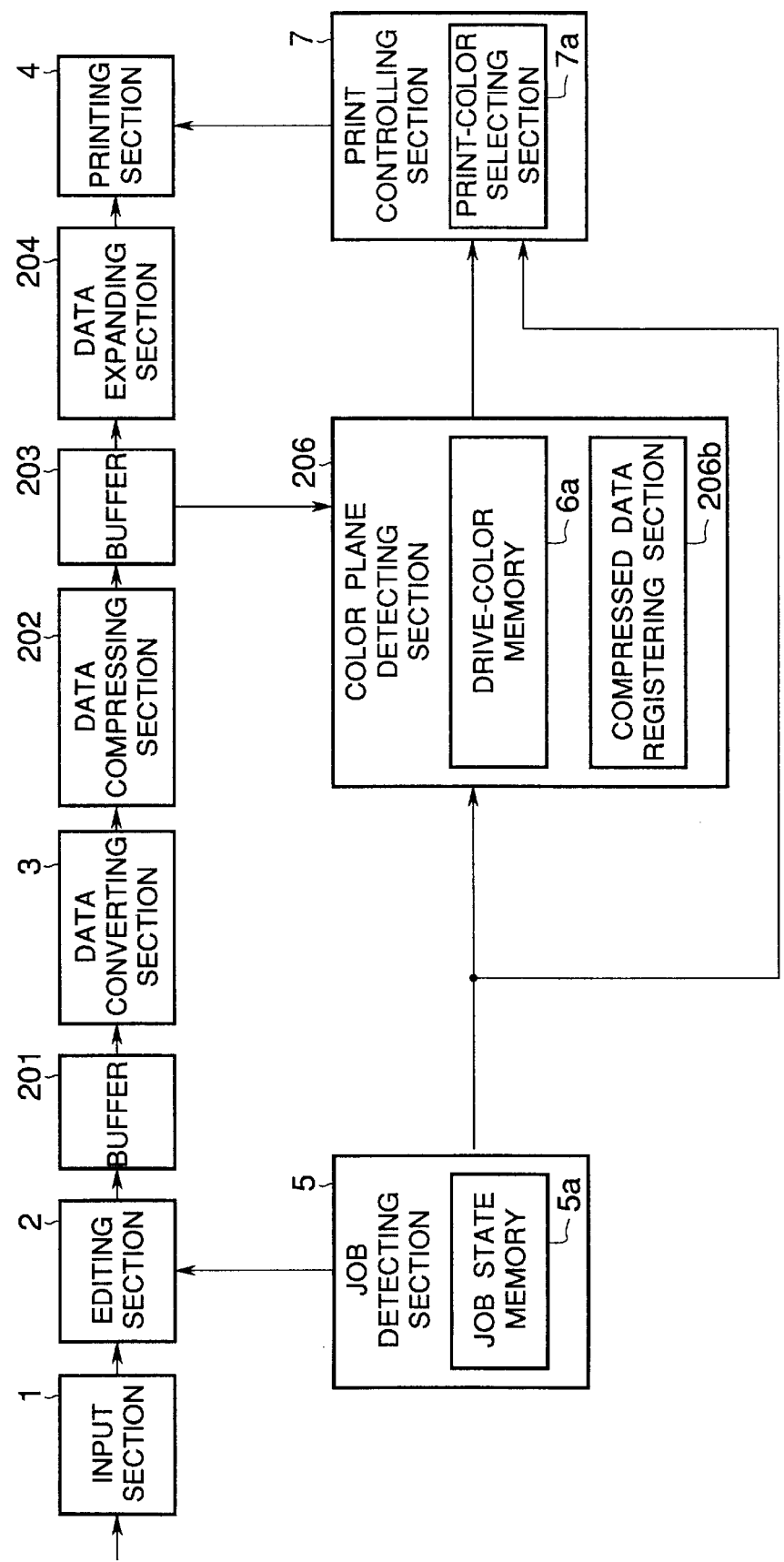
FIG. 25 is a block diagram showing a construction of the color image printer according to an eighth embodiment.

FIG. 25 is a block diagram showing a construction of the color image printer according to an eighth embodiment. The color image printer includes an input section 1, editing section 2, buffer 201, data converting section 3, data compressor 202, buffer 203, data expander 204, printing section 4, job detecting section 5, color plane detecting section 206, and print controlling section 7. Elements similar to those shown in FIG. 1 (first embodiment) have been given the same reference numerals and the description thereof is omitted.

The editing section 2 edits the print data on a page-by-page basis. The print data edited by the editing section 2 is temporarily stored in a buffer 201. The data converting section 3 reads the data stored in the buffer 201 and converts the data into bit map data for the respective colors on a page-by-page basis. The bit map data is then divided into "bands" each of which includes a predetermined number of lines. The data compressor 202 compresses the bit map data for the respective colors using a predetermined compression algorithm and temporarily stores the compressed bands into the buffer 203.

The data expander 204 expands the compressed bit map data in the buffer 203. The bit map data is expanded on a band-by-band basis and output to the printing section 4. This data processing allows effective use of a limited memory area capacity.

The color plane detecting section 206 differs from that shown in FIG. 1 in that a compressed data registering section 206b is added to the color plane detecting section 6. The compressed data registering section 206b has compressed reference data stored therein. The compressed reference data is produced by compressing a "band" whose bits are all logic "0", using the aforementioned compression algorithm. The color plane detecting section 206 compares the compressed bit map data for one page with the compressed reference data on a band-by-band basis, thereby determining whether there is any data for the respective colors.

<Operation>

Figure 26:
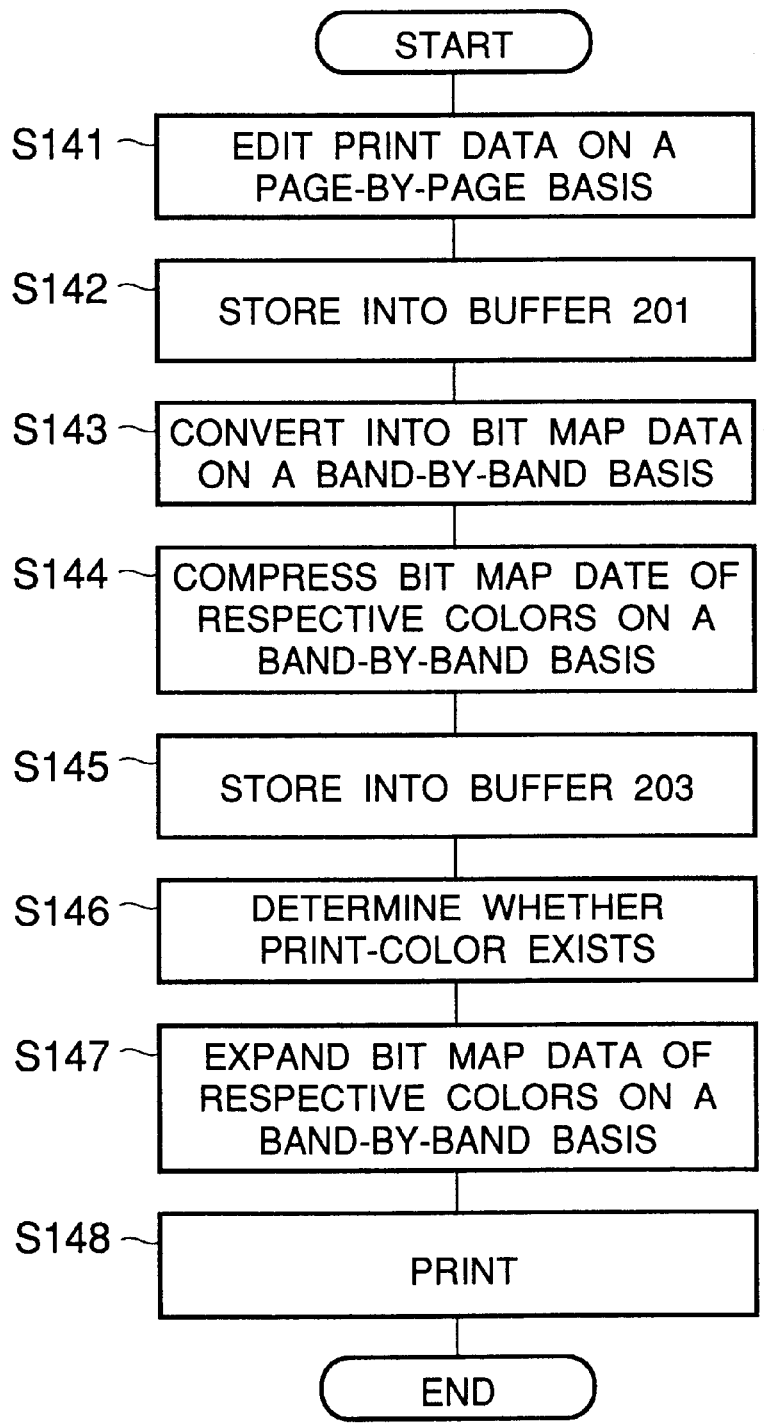
FIG. 26 is a flowchart illustrating the operation of a color image printer according to the eighth embodiment.

FIG. 26 is a flowchart illustrating the operation of a color image printer according to the eighth embodiment. It is assumed that the print data for one page has been supplied to the input section 1.

Print data input to the input section 1 is edited by the editing section 2 on a page-by-page basis (step S141) and stored into the buffer 201 (step S142). The data converting section 3 reads the print data stored in the buffer 201 and converts the print data into bit map for the respective colors on a band-by-basis (step S143).

Then, the bit map data is compressed on a band-by-band basis (step S144). Thus, compressed bit map data of four colors for one page is stored in the buffer 203 (step S145).

The color plane detecting section 206 performs the procedure for determining drive-colors similar just like the first embodiment (step S146) and the data expander 204 expands the bit map data (step S147). Then, the printing section 4 performs a printing operation in accordance with the bit map data for one page (step S148).

Figure 27:
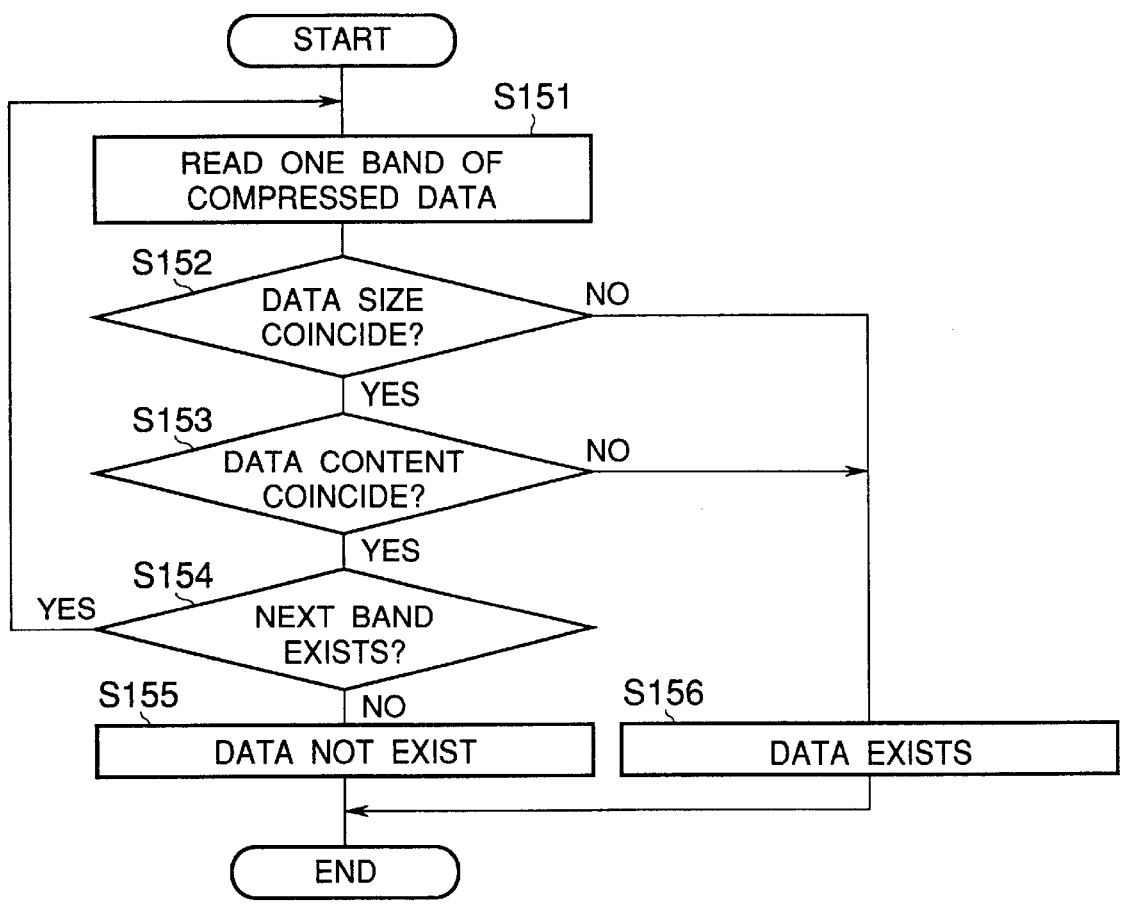
FIG. 27 is a flowchart, illustrating, by way of example, the procedure for detecting print data for one color.

FIG. 27 is a flowchart illustrating, by way of example, the procedure for detecting print data for one color.

One band of the compressed data is read from the buffer 203 (step S151) and compared with the reference compressed data stored in the compressed data registering section 206b to determine whether their data size are the same (step S152). If the answer at step S152 is YES, then the program proceeds to step S153 where a check is made to determine whether the content of the data read from the buffer 203 is the same as that of the reference compressed data. If the answer is YES at step S153, then the program proceeds to step S154 where a search is made to determine whether the next band exists. If the answer is YES at step S154, then the program jumps back to step S151.

If the answer is NO at step S154, then it is determined that there is no more print data and the program proceeds to END.

If the answer is NO at step S152 or step S153, then the program jumps to step S156 where it is determined that there is print data, and the program proceeds to END.

The data compression performed by the data compressing section 202 will be described with respect to a case where the run length coding is used. In this embodiment, it is assumed that the size of the band is one line having 3000 bits (375 bytes). The bit map data is divided into 8-bit patterns. The number of times an 8-bit pattern appears consecutively is expressed in, for example, eight bits. The code is a combination of the number of times and the 8 bit pattern. The eight bits can express the number of times of up to 256.

Coding one line (3000 bits) whose bits are all logic "0" results in 375 consecutive "0s". Thus, eight bits are not enough to express 375. Since 375 is greater than 256, the number of times is expressed in the form of 256 and 119 using two 8-bit signals. The reference compressed data is FFh, 00h, 76h, and 00h ("h" denotes hexadecimal).

If bit map data, which has not been compressed, is checked on a byte-by-byte basis to determine whether all the bits are "0", comparison of bits must be performed 375 times. In contrast, If bit map data, which has been compressed, is checked to determine whether all the bits are "0", only four bytes of data must be compared, greatly decreasing the amount of data which must be processed.

<Advantage>

The detecting the presence and absence of print data according to the eighth embodiment greatly reduces the influence of detection of data on the throughout of the printer.

Ninth Embodiment

<Construction>

Figure 28:
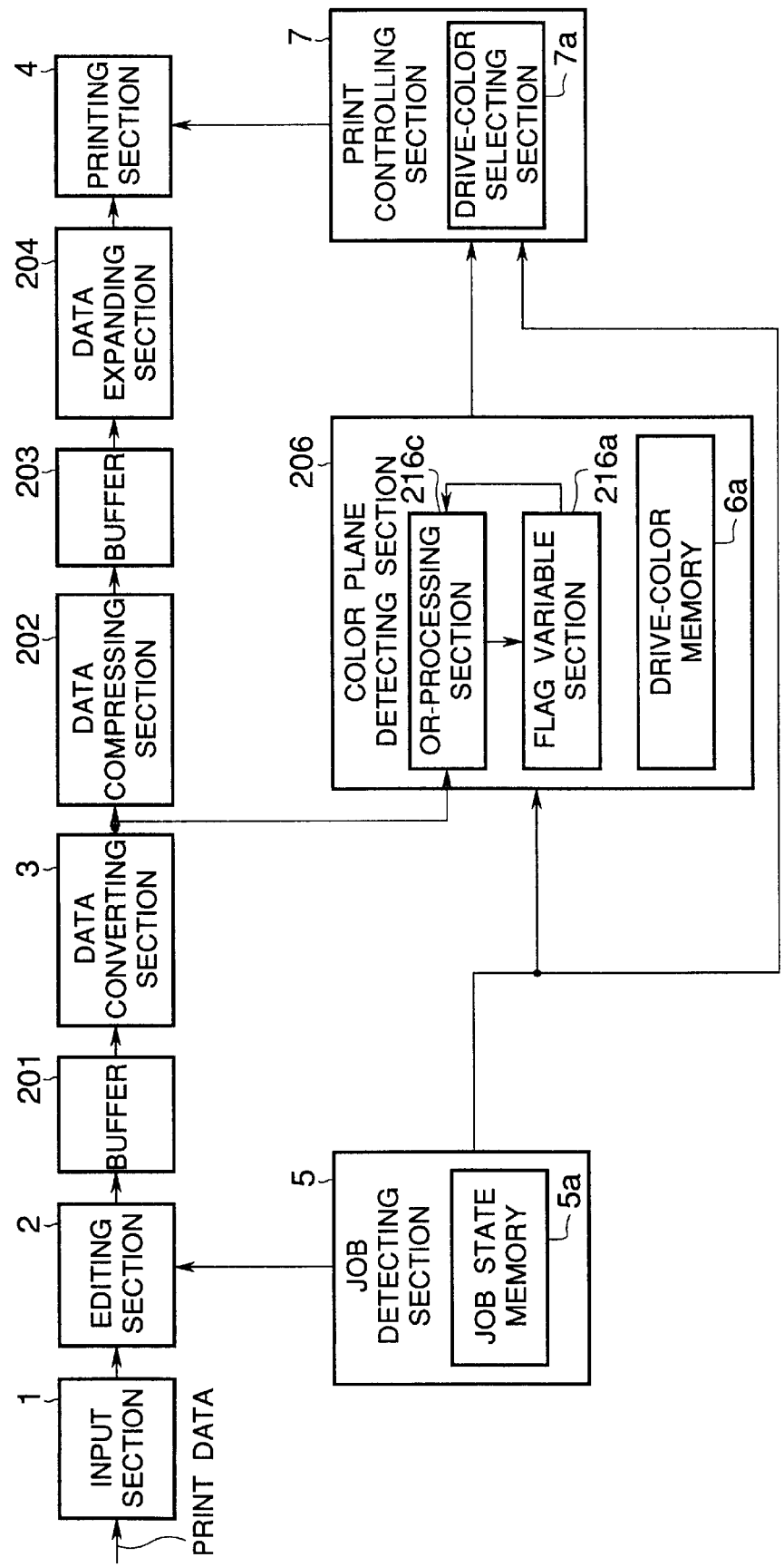
FIG. 28 is a block diagram illustrating the general construction of a color image printer according to a ninth embodiment.

FIG. 28 is a block diagram illustrating the general construction of a color image printer according to a ninth embodiment.

The ninth embodiment differs from the eighth embodiment in that a color plane detecting section 216 is used in place of the color plane detecting section 206 shown in FIG. 25.

Elements similar to those shown in FIG. 1 have been given the same reference numerals and the description thereof is omitted.

The converting section 3 converts the print data stored in the buffer 201 into the bit map data for the respective colors on a band-by-band basis, and outputs the bit map data simultaneously to the data compressing section 202 and the color plane detecting section 216.

The color plane detecting section 216 differs from the color plane detecting section 6 shown in FIG. 1 in that an OR-processing section 216c and the flag variable section 216d are added.

The flag variable section 216d stores 4-byte data, each byte having eight bits. Each byte represents the present and absence of a corresponding color, i.e., yellow, magenta, cyan, or black print data. Each byte has been set to "0" initially.

The OR-processing section 216c receives the bit map data for the respective colors from the data converting section 3 on a byte-by-byte basis. The OR-processing section 216c also receives one byte of data from the flag variable section 216d. The OR-processing section 216c compares data from the flag variable section 216d with the data received from the data converting section 3, and stores ORed outputs back into the flag variable section 216d. This OR-processing is carried out for the bit map data for one page, for the respective colors.

If the byte last written into the flag variable section 216d is "0," then it is determined that there is no further print data, and if the byte is not "0," then it is determined that there is some more print data.

The color plane detecting section 216 checks the byte data for the respective colors stored in the flag variable section 216d on a page-by-page basis, thereby updating the drive-colors stored in the drive-color memory 6a.

<Operation>

Figure 29:
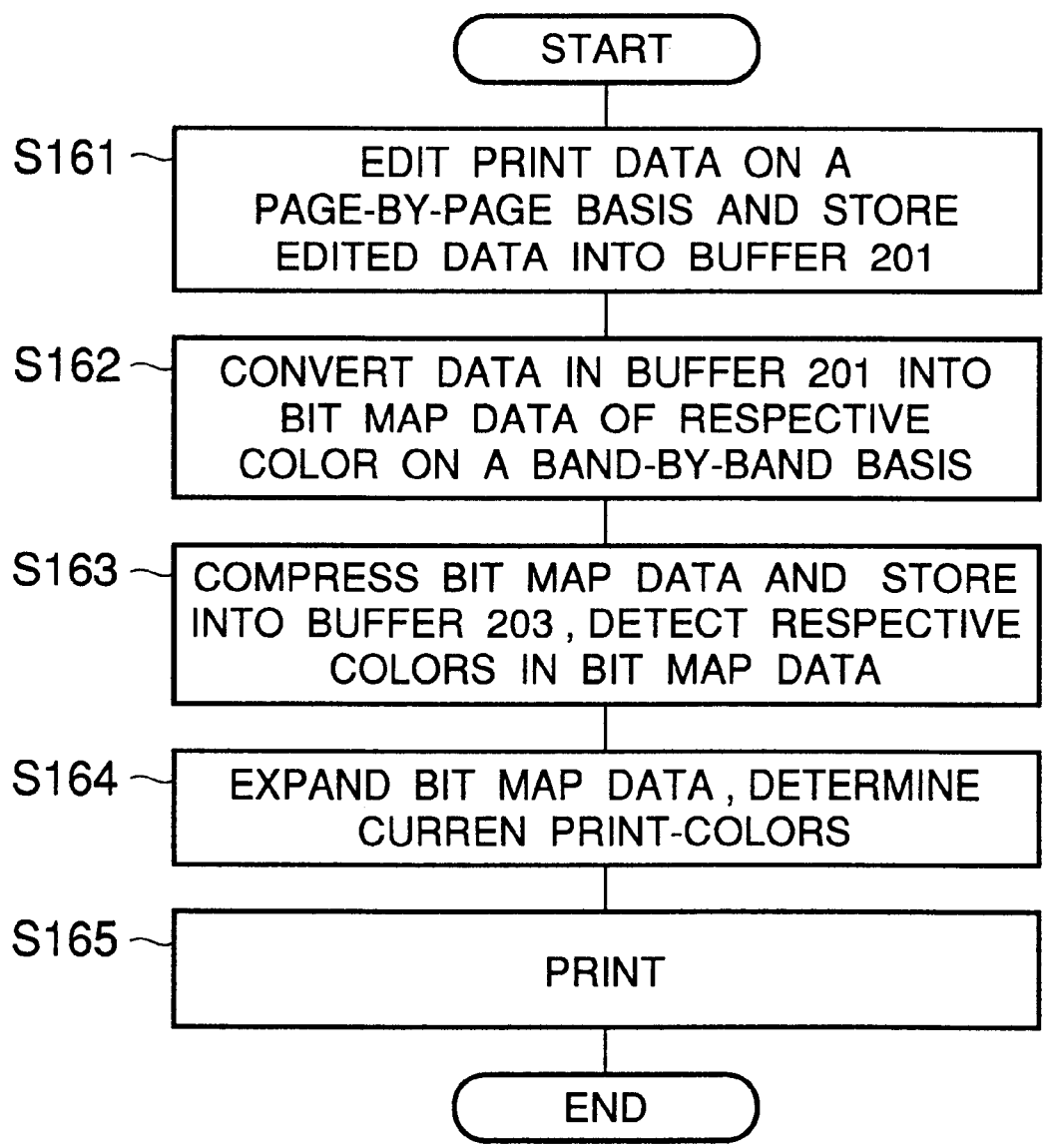
FIG. 29 is a flowchart illustrating the operation of a color image printer according to the ninth embodiment.

FIG. 29 is a flowchart illustrating the operation of a color image printer according to the ninth embodiment. It is assumed that bit map data for one page has been converted by the data converting section 3.

The print data input to the input section 1 is edited on a page-by-page basis by the editing section 2 and is stored into the buffer 201 (step S161). The data converting section 3 reads the print data stored in the buffer 201, converts the print data into bit map data for the respective colors on a band-by-band basis, and outputs simultaneously to the data compressing section 202 and the OR-processing section 216c (step S162).

Then, at step S163, the data compressing section 202 compresses the bit map data for the respective colors and stores the compressed data for one page into the buffer 203, while at the same time the OR-processing section 216c and the flag variable 216d carry out the procedure for determining the presence and absence of the bit map data for the respective colors. Thus, the compression operation of the bit map data and the OR-processing of the. bit map data are carried out concurrently.

Then, at step S164, the data expanding section 204 expands the bit map data while the color plane detecting section 216 detects colors in the bit map data so that positioning mechanism 60 are brought to the operative positions according to the detected colors. The printing section 4 prints one page (step S165).

Figure 30:
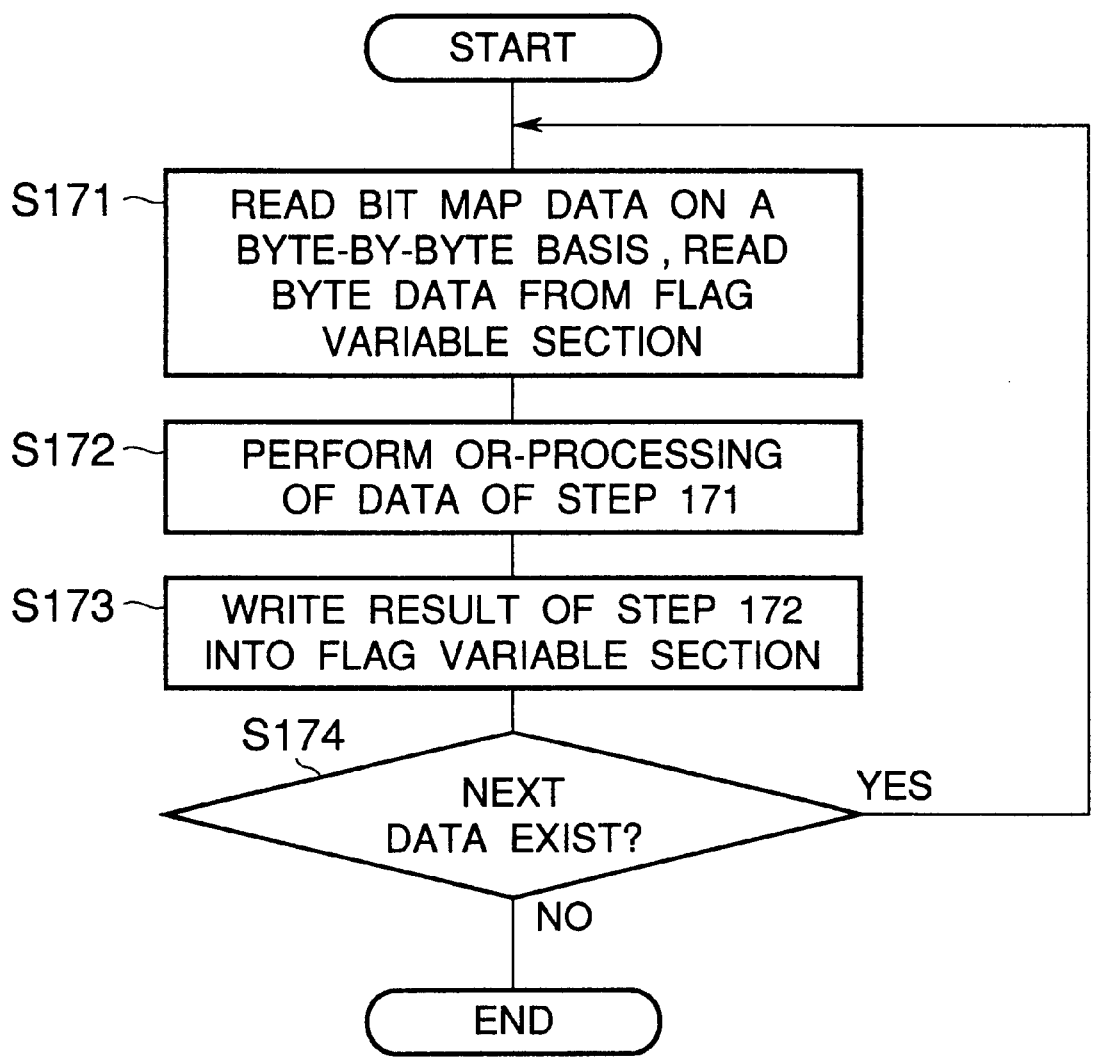
FIG. 30 is a flowchart illustrating, by way of example, the procedure for detecting print data for one color performed by the OR-processing section 216c and the flag variable section 216d.

FIG. 30 is a flowchart illustrating, by way of example, the procedure for detecting print data for one color performed by the OR-processing section 216c and the flag variable section 216d.

The OR-processing section 216c receives one byte of bit map data from the data converting section 3 and one byte of data for a corresponding color stored in the flag variable section 216d (step S171). The OR-processing section 216c then ORs the two inputs thereto and outputs the ORed results to the flag variable section 216d which stores the ORed results therein (step S173).

Then, at step S174, a check is made to determine whether the next byte data exists in the bit map data; if the answer is YES, then the program jumps back to step S171, and if the answer is NO, then the program proceeds to END.

When there is no current drive-color in the CDC area of the drive-color memory 6a, the color plane detecting section 216 checks the byte data stored in the flag variable section 216d. If the byte of data is found to be "0", then it is determined that there is no bit map data. If the byte of data is not found to be "0", then it is determined that bit map data exists.

<Advantages>

The compressing operation performed by the data compressing section 202 and the print data detecting operation performed by the color plane detecting section 216 are carried out simultaneously.

Thus, the current drive-colors can be updated promptly, further reducing the influence of the print data detecting process on the print throughput.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for printing color images from print data, having a plurality of image forming sections with corresponding photoconductors on which toner images of different colors are formed, each photoconductor having a rotational axis and each photoconductor forming a toner image corresponding to a color of the print data, the respective toner images being transferred in registry onto a printing medium to form a color image, the apparatus comprising:

transfer sections, each transferring the toner image of each color formed on the corresponding photoconductor onto the printing medium;

a plurality of positioning mechanisms, each selectively causing the rotational axis of a corresponding photoconductor to move to an operative position where the rotational axis of the photoconductor is close to a transfer section and a non-operative position where the rotational axis of the photoconductor is away from the transfer section, the photoconductor moving in a direction essentially normal to a plane in which the printing medium lies;

a controlling section, controlling each of the plurality of positioning mechanisms to switch between the operative position and the non-operative position; and a color detecting section, detecting each color of a page of the print data;

wherein when all of said plurality of positioning mechanisms have been brought to their non-operative positions, said controlling section selectively controls said positioning mechanisms in a first operation mode or in a second operation mode according to the colors detected by said color detecting section.

2. An apparatus according to claim 1, wherein said controlling section causes all of said plurality of positioning mechanisms to bring the photoconductors to the non-operative positions upon powering up the printer.

3. An apparatus according to claim 1, wherein said first operation mode is a mode where when printing a first page, said controlling section causes a positioning mechanism to bring a corresponding photoconductor to the operative position in accordance with a color detected by said color detecting section; and when printing a page after the first page, said controlling section causes an additional positioning mechanism to bring a corresponding photoconductor to the operative position if said color detecting section has detected a color whose corresponding photoconductor is at the non-operative position.

4. An apparatus according to claim 3, further comprising a counter which counts a number of times that colors in a preceding page of two successive pages detected by said color detecting section coincide with colors in a following page of the two successive pages;

wherein when the counter has not counted up to a predetermined value, said controlling section causes a positioning mechanism to bring a corresponding photoconductor from the non-operative position to the operative position, the photoconductor corresponding to color detected by said color detection section; and when the counter has counted up to the predetermined value, said controlling section causes a positioning mechanisms to bring a corresponding photoconductors to the operative position, the photoconductors corresponding to the colors in the following page.

5. An apparatus according to claim 1, wherein said second operation mode is a mode where if said color detecting section has detected black in a first page, the controlling section causes a positioning mechanism corresponding to black to be brought to the operative position; and if said color detecting section has detected any one of yellow, magenta, and cyan in the first page, the controlling section causes all of said plurality of positioning mechanisms to bring corresponding photoconductors to their operative positions.

6. An apparatus according to claim 5, further comprising a counter which counts a number of times that colors in a preceding page of two successive pages detected by said color detecting section coincide with colors in a following page of the two successive pages;

wherein when the counter has not counted up to a predetermined value, said controlling section causes a positioning mechanism to bring a corresponding photoconductor from the operative position to the non-operative position, the photoconductor corresponding to a color detected by said color detecting section; and when the counter has counted up to the predetermined value, said controlling section causes positioning mechanisms to bring corresponding photoconductors to their operative positions, the photoconductors corresponding to the colors in the following page.

7. An apparatus according to claim 1, further including a job detecting section detecting a least one of a job beginning instruction and a job ending instruction contained in the print data, said controlling section causing all of the positioning mechanisms to bring the corresponding photoconductors to their non-operative positions when said job detecting section has detected one of the job beginning instruction and the job ending instruction.

8. An apparatus according to claim 7, wherein said first operation mode is a mode where when printing a first page, said controlling section causes a positioning mechanism to bring a corresponding photoconductor to the operative position in accordance with a color detected by said color detecting section;

when printing a page after the first page, said controlling section causes an additional positioning mechanism to bring a corresponding photoconductor to the operative position if said color detecting section has detected a color whose corresponding photoconductor is at the non-operative position.

9. An apparatus according to claim 7, wherein said second operation mode is a mode where if said color detecting section has detected black in a first page, the controlling section causes a positioning mechanism corresponding to black to be brought to the operative position; and if said color detecting section has detected any one of yellow, magenta, and cyan in the first page, the controlling section causes all of said plurality of positioning mechanisms to bring the corresponding photoconductors to their operative positions.

10. An apparatus according to claim 1, further including a monitoring section monitoring operations of said plurality of image forming sections, said controlling section causing all of the positioning mechanisms to bring the corresponding photoconductors to their non-operative positions when said monitoring section detects that the plurality of image forming sections have entered an idle state where no print data is being supplied to the image forming sections.

11. An apparatus according to claim 10, wherein said second operation mode is a mode where if said color detecting section has detected black in a first page, the controlling section causes a positioning mechanism corresponding to black to be brought to the operative position; and if said color detecting section has detected any one of yellow, magenta, and cyan in the first page, the controlling section causes all of said plurality of positioning mechanisms to bring the corresponding photoconductors to their operative positions.

12. An apparatus according to claim 10, wherein said first operation mode is a mode where when printing a first page, said controlling section causes a positioning mechanism to bring a corresponding photoconductor to the operative position in accordance with a color detected by said color detecting section;

when printing a page after the first page, said controlling section causes an additional positioning mechanism to bring a corresponding photoconductor to the operative position if said color detecting section has detected a color whose corresponding photoconductor is at the non-operative position.

13. An apparatus according to claim 1, further including:

a job detecting section detecting at least one of a job beginning instruction and a job ending instruction contained in the print data; and a monitoring section monitoring operations of said plurality of image forming sections;

wherein said controlling section causes all of said positioning mechanisms to bring the corresponding photoconductors to their non-operative positions when said job detecting section has detected any one of the job beginning instruction and the job ending instruction; and said controlling section causes all of the positioning mechanisms to bring the corresponding photoconductors to their non-operative positions when said monitoring section detects that the plurality of image forming sections have entered an idle state where no print data is being supplied to the image forming sections.

14. An apparatus according to claim 1, further comprising:

a job detecting section detecting a job beginning instruction and a job ending instruction of a current job if the current job has the job beginning instruction and job ending instruction;

a memory section holding information on whether a preceding job has the job beginning instruction and the job ending instruction; and a monitoring section monitoring operations of said plurality of image forming sections to detect whether said plurality of the image forming sections are in an operative state or in an idle state;

wherein when said job detecting section has detected the job beginning instruction of the current job, said controlling section causes all of said positioning mechanisms to bring the corresponding photoconductors to their non-operative positions before said color detecting section detects a color in a first page of the current job;

when said job detecting section has detected the job ending instruction of the current job, said controlling section causes all of the said positioning mechanisms to bring the corresponding photoconductors to their non-operative positions; and when the information held in said memory section indicates that the preceding job does not include the job beginning instruction and the job ending instruction, said controlling section causes all of said positioning mechanisms to bring the corresponding photoconductors to their non-operative position before said color detecting section detects a color in a first page of the current job;

when said monitoring section detects that the plurality of image forming sections have entered the idle state where no print data is supplied to the image forming sections, said controlling section causes all of said positioning mechanisms to bring the corresponding photoconductors to their non-operative positions.

15. A color printing apparatus comprising:

a data converting section which converts print data of one page into bit map data of colors corresponding to those in the print data;

a data compressing section which compresses the bit map data into a smaller data size;

a data expanding section which expands the bit map data compresses by said data compressing section;

a data registering section which stores compressed reference bit map data whose bits are all of a logic "0"; and a data detecting section which compares the bit map data compressed by said data compressing section with the compressed reference bit map data to determine whether bit map data of a corresponding color exists in the print data for the one page.

16. A color printing apparatus comprising:

a data converting section which converts print data of one page into bit map data of colors corresponding to those in the print data;

a color detecting section which searches the bit map data to determine presence and absence of bit map data of a corresponding color in the page;

a data compressing section which compresses the bit map data converted by said data converting section into a smaller data size; and a data expanding section which expands the map data compressed by said data compressing section;

wherein said data converting section outputs the bit map data simultaneously to the data detecting section and said data compressing section so that said data detecting section begins to determine the corresponding colors at substantially the same time that said data compressing section begins to compress the bit map data.

17. A color printing apparatus according to claim 16, wherein the bit map data is ORed with reference data and an ORed result is checked to determine whether print data of the corresponding color is present or absent.

18. An apparatus for printing color images from print data, having a plurality of image forming sections with corresponding photoconductors on which toner images of different colors are formed, each photoconductor having a rotational axis and each photoconductor forming a toner image corresponding to a color of the print data, the respective toner images being transferred in registry onto a printing medium to form a color image, the apparatus comprising:

transfer sections, each transferring the toner image of each color formed on the corresponding photoconductor onto the printing medium;

a plurality of positioning mechanisms, each selectively causing the rotational axis of a corresponding photoconductor to move to an operative position where the rotational axis of the photoconductor is close to a transfer section and a non-operative position where the rotational axis of the photoconductor is away from the transfer section, the photoconductor moving in a direction essentially normal to a plane in which the printing medium lies;

a controlling section, controlling each of the plurality of positioning mechanisms to switch between the operative position and the non-operative position; and a color detecting section, detecting each color of a page of the print data;

wherein when a photoconductor corresponding to a color detected by said color detecting section is at the non-operative position, said controlling section controls a corresponding one of said plurality of positioning mechanisms to position the photoconductor corresponding to the detected color at the operative position.

19. An apparatus according to claim 18, wherein said controlling section causes all of said plurality of positioning mechanisms to bring the photoconductors to the non-operative positions upon powering up the printer.

20. An apparatus according to claim 18, wherein when printing a first page, said controlling section causes the positioning mechanisms to bring the corresponding photoconductors to the operative position only with respect to those colors detected on the first page by said color detecting section; and when printing a page after the first page, said controlling section causes an additional positioning mechanism to bring a corresponding photoconductor to the operative position if said color detecting section has detected a color on the page after the first page whose corresponding photoconductor is at the non-operative position.

21. An apparatus according to claim 20, further comprising a counter which counts a number of times that colors in a preceding page of two successive pages detected by said color detecting section coincide with colors in a following page of the two successive pages;

wherein when the counter has not counted up to a predetermined value, said controlling section causes a positioning mechanism to bring a corresponding photoconductor from the non-operative position to the operative position, the photoconductor corresponding to color detected by said color detection section; and when the counter has counted up to the predetermined value, said controlling section causes a positioning mechanisms to bring a corresponding photoconductors to the operative position, the photoconductors.corresponding to the colors in the following page.

22. An apparatus according to claim 18, wherein the controlling section is further configured such that if said color detecting section has detected black in a first page, the controlling section causes a positioning mechanism corresponding to black to be brought to the operative position; and if said color detecting section has detected any one of yellow, magenta, and cyan in the first page, the controlling section causes all of said plurality of positioning mechanisms to bring the corresponding photoconductors to their operative positions.

23. An apparatus according to claim 22, further comprising a counter which counts a number of times that colors in a preceding page of two successive pages detected by said color detecting section coincide with colors in a following page of the two successive pages;

wherein when the counter has not counted up to a predetermined value, said controlling section causes a positioning mechanism to bring a corresponding photoconductor from the operative position to the non-operative position, the photoconductor corresponding to a color detected by said color detecting section; and when the counter has counted up to the predetermined value, said controlling section causes positioning mechanisms to bring corresponding photoconductors to their operative positions, the photoconductors corresponding to the colors in the following page.

24. An apparatus according to claim 18, further including a job detecting section detecting a least one of a job beginning instruction and a job ending instruction contained in the print data, said controlling section causing all of the positioning mechanisms to bring the corresponding photoconductors to their non-operative positions when said job detecting section has detected one of the job beginning instruction and the job ending instruction.

25. An apparatus according to claim 24, wherein when printing a first page, said controlling section causes the positioning mechanisms to bring the corresponding photoconductors to the operative position only with respect to those colors detected on the first page by said color detecting section; and when printing a page after the first page, said controlling section causes an additional positioning mechanism to bring a corresponding photoconductor to the operative position if said color detecting section has detected a color on the page after the first page whose corresponding photoconductor is at the non-operative position.

26. An apparatus according to claim 24, wherein the controlling section is further configured such that if said color detecting section has detected black in a first page, the controlling section causes a positioning mechanism corresponding to black to be brought to the operative position; and if said color detecting section has detected any one of yellow, magenta, and cyan in the first page, the controlling section causes all of said plurality of positioning mechanisms to bring the corresponding photoconductors to their operative positions.

27. An apparatus according to claim 18, further including a monitoring section monitoring operations of said plurality of image forming sections, said controlling section causing all of the positioning mechanisms to bring the corresponding photoconductors to their non-operative positions when said monitoring section detects that the plurality of image forming sections have entered an idle state where no print data is being supplied to the image forming sections.

28. An apparatus according to claim 27, wherein the controlling section is further configured such that if said color detecting section has detected black in a first page, the controlling section causes a positioning mechanism corresponding to black to be brought to the operative position; and if said color detecting section has detected any one of yellow, magenta, and cyan in the first page, the controlling section causes all of said plurality of positioning mechanisms to bring the corresponding photoconductors to their operative positions.

29. An apparatus according to claim 27, wherein when printing a first page, said controlling section causes the positioning mechanisms to bring the corresponding photoconductors to the operative position only with respect to those colors detected on the first page by said color detecting section; and when printing a page after the first page, said controlling section causes an additional positioning mechanism to bring a corresponding photoconductor to the operative position if said color detecting section has detected a color on the page after the first page whose corresponding photoconductor is at the non-operative position.

30. An apparatus according to claim 18, further including:

a job detecting section detecting at least one of a job beginning instruction and a job ending instruction contained in the print data; and a monitoring section monitoring operations of said plurality of image forming sections;

wherein said controlling section causes all of said positioning mechanisms to bring the corresponding photoconductors to their non-operative positions when said job detecting section has detected any one of the job beginning instruction and the job ending instruction; and said controlling section causes all of the positioning mechanisms to bring the corresponding photoconductors to their non-operative positions when said monitoring section detects that the plurality of image forming sections have entered an idle state where no print data is being supplied to the image forming sections.

31. An apparatus according to claim 18, further comprising:

a job detecting section detecting a job beginning instruction and a job ending instruction of a current job if the current job has the job beginning instruction and job ending instruction;

a memory section holding information on whether a preceding job has the job beginning instruction and the job ending instruction; and a monitoring section monitoring operations of said plurality of image forming sections to detect whether said plurality of the image forming sections are in an operative state or in an idle state;

wherein when said job detecting section has detected the job beginning instruction of the current job, said controlling section causes all of said positioning mechanisms to bring the corresponding photoconductors to their non-operative positions before said color detecting section detects a color in a first page of the current job;

when said job detecting section has detected the job ending instruction of the current job, said controlling section causes all of the said positioning mechanisms to bring the corresponding photoconductors to their non-operative positions; and when the information held in said memory section indicates that the preceding job does not include the job beginning instruction and the job ending instruction, said controlling section causes all of said positioning mechanisms to bring the corresponding photoconductors to their non-operative position before said color detecting section detects a color in a first page of the current job;

when said monitoring section detects that the plurality of image forming sections have entered the idle state where no print data is supplied to the image forming sections, said controlling section causes all of said positioning mechanisms to bring the corresponding photoconductors to their non-operative positions.

* * * * *